(12) United States Patent
Kim et al.

(10) Patent No.: US 8,954,708 B2
(45) Date of Patent: Feb. 10, 2015

(54) METHOD OF STORING DATA IN NON-VOLATILE MEMORY HAVING MULTIPLE PLANES, NON-VOLATILE MEMORY CONTROLLER THEREFOR, AND MEMORY SYSTEM INCLUDING THE SAME

(75) Inventors: Jin Yeong Kim, Suwon-si (KR); Du-Won Hong, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 210 days.

(21) Appl. No.: 13/617,507

(22) Filed: Sep. 14, 2012

(65) Prior Publication Data

US 2013/0166825 A1 Jun. 27, 2013

(30) Foreign Application Priority Data

Dec. 27, 2011 (KR) ........................ 10-2011-0143370

(51) Int. Cl.
*G06F 12/04* (2006.01)

(52) U.S. Cl.
USPC .................... 711/202; 711/103; 711/E12.008

(58) Field of Classification Search
USPC .................................. 711/103, 202, E12.008
See application file for complete search history.

(56) References Cited

U.S. PATENT DOCUMENTS

| 5,890,192 | A  | * | 3/1999  | Lee et al. ................... 711/103 |
| 7,411,858 | B2 |   | 8/2008  | Ju |
| 7,502,259 | B2 |   | 3/2009  | Gorobets |
| 2008/0034153 | A1 | * | 2/2008  | Lee et al. ................... 711/103 |
| 2010/0023681 | A1 | * | 1/2010  | Sinclair et al. ............. 711/103 |
| 2010/0030944 | A1 | * | 2/2010  | Hinz ......................... 711/103 |
| 2010/0049908 | A1 | * | 2/2010  | Gonzalez et al. .......... 711/103 |
| 2010/0058003 | A1 |   | 3/2010  | Goto et al. |
| 2010/0082917 | A1 |   | 4/2010  | Yang et al. |
| 2010/0257308 | A1 | * | 10/2010 | Hsu et al. .................. 711/103 |
| 2010/0306448 | A1 | * | 12/2010 | Chen et al. ................ 711/103 |

FOREIGN PATENT DOCUMENTS

| KR | 100685638 B1 | 2/2007 |
| KR | 20100037416 A | 4/2010 |

* cited by examiner

*Primary Examiner* — Hal Schnee

(74) *Attorney, Agent, or Firm* — Harness, Dickey & Pierce, P.L.C.

(57) ABSTRACT

A method of controlling a non-volatile memory device having multiple planes including receiving write requests from a host, the write requests each including a logical address, a write command, and a data set; storing the data sets at an address of a buffer; storing the buffer address in a mapping table that maps addresses of the buffer to the multiple planes; sequentially transmitting the data sets stored at respective buffer addresses to page buffers, respectively, of the planes corresponding to the buffer addresses according to the mapping table; and programming in parallel at least two data sets stored in respective page buffers to memory cells of the non-volatile memory device.

27 Claims, 21 Drawing Sheets

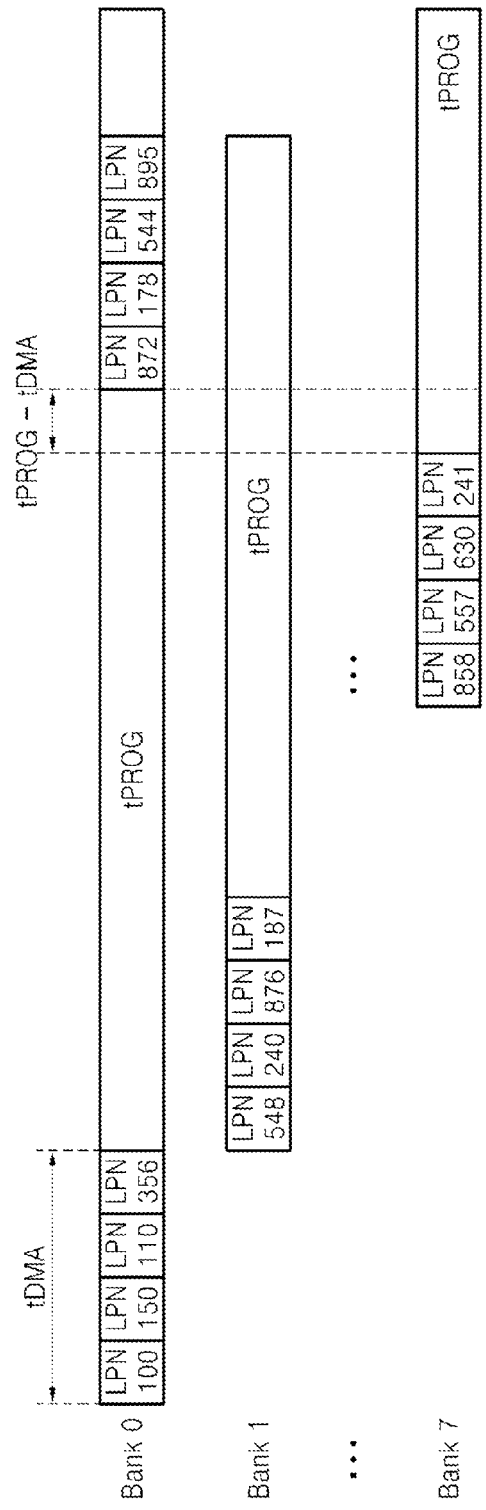

METHOD OF STORING DATA IN NON-VOLATILE MEMORY HAVING MULTIPLE PLANES, NON-VOLATILE MEMORY CONTROLLER THEREFOR, AND MEMORY SYSTEM INCLUDING THE SAME

CROSS-REFERENCE TO RELATED APPLICATIONS

This application claims priority under 35 U.S.C. §119(a) from Korean Patent Application No. 10-2011-0143370 filed on Dec. 27, 2011, the disclosure of which is hereby incorporated by reference in its entirety.

BACKGROUND

Embodiments of the inventive concepts relate to a semiconductor memory device, and more particularly, to a memory controller for controlling a non-volatile memory device, a memory system including the same, and a program control method thereof.

Memory devices are classified into volatile memory devices and non-volatile memory devices. Volatile memory devices include dynamic random access memory (DRAM) and static random access memory (SRAM). Non-volatile memory devices include flash memory, electrically erasable programmable read-only memory (EEPROM), and resistive memory.

A non-volatile memory device, for example, a flash memory device, is designed in a multi-plane type in order to increase a storage capacity. A multi-plane type non-volatile memory device includes a plurality of planes, each of which includes a plurality of memory blocks.

A host may request a non-volatile memory device to perform a read operation, a program operation, and an erase operation. When the program operation is requested, logical addresses corresponding to data to be programmed may be sequential in some occasions but may not be sequential in other occasions. For instance, when data at independent areas in the host are requested to be programmed, logical addresses may not be sequential.

When logical addresses of data are sequential, programming time can be shortened by using a multi-plane operation allowing the simultaneous programming of pages respectively corresponding to the sequential logical addresses, one in each plane.

However, when the multi-plane operation is used for data whose logical addresses are not sequential, it is relatively hard to shorten the programming time. Further, an amount of data the memory controller has to write in relation to the amount of data that the host has to write known as a write amplification factor (WAF) increases.

SUMMARY

According to some embodiments of the inventive concepts, there is provided a method of controlling a non-volatile memory device including multiple planes. The method includes receiving a write request from a host, the write request including a data set; storing the data set at an buffer address; storing the buffer address in a mapping table, the mapping table configured to map the buffer addresses to the multiple planes, and the buffer address corresponding to where the data set is stored; sequentially transmitting data sets stored at respective buffer addresses to page buffers of the planes corresponding to the buffer addresses according to the mapping table; and programming in parallel at least two data sets stored in respective page buffers to memory cells of the non-volatile memory device.

The data sets programmed in parallel may not have sequential logical addresses.

The number of the multiple planes may be at least two.

The write request may be a random write request.

According to other embodiments of the inventive concepts, there is provided a method of controlling a non-volatile memory device including multiple planes. The method includes the operations of storing, in a buffer, a data of as many valid pages as a number of the multiple planes from the non-volatile memory device; storing a buffer address in a mapping table, the buffer address corresponding to where the data of each valid page is stored, the mapping table configured to map the buffer address to each of the planes; and performing a multi-plane program operation on the data of the valid page stored at each buffer address according to the mapping table.

The performing the multi-plane program operation may include sequentially transmitting the data of the valid pages from the buffer to page buffers, respectively, of the respective planes; and simultaneously programming the data in the page buffers based on a physical address assocated with the data.

According to further embodiments of the inventive concepts, there is provided a memory system including a buffer memory; a non-volatile memory device including multiple planes; and a memory controller configured to receive a plurality of write requests, each write request including a logical address, a write command, and a data set from a host, store the data sets in the buffer memory in response to the write request, the data sets having logical addresses that are not sequential and perform a multi-plane program operation to program the data sets stored in the buffer memory to the non-volatile memory device when the number of the data set stored in the buffer memory is at least a desired (or, alternatively a predetermined) number of multiple planes.

The data sets subjected to the multi-plane program operation may not be sequential.

The memory controller may include a mapping table including buffer address information corresponding to each of the multiple planes.

According to further embodiments of the inventive concepts, there is provided a memory controller configured to control a non-volatile memory device. The memory controller includes a buffer memory configured to store data sets received from a host; and a central processing unit (CPU) configured to control the non-volatile memory device to perform a multi-plane program operation to program the data sets stored in the buffer memory in the non-volatile memory device, in response to a write request, the write request including a logical address and a data set from the host.

Here, the data sets subjected to the multi-plane program operation have logical addresses that are not sequential.

According to another example embodiments, there is provided a method of controlling a non-volatile memory device via a memory controller. The non-volatile memory device having multiple planes, each plane including a page buffer. The memory controller including a buffer memory configured to store a plurality of data sets having non-sequential logical addresses. The method including receiving, at the memory controller, a plurality of write requests, each write request including a logical address and a data set of the plurality of data sets; storing each of the data sets at an address of the buffer memory; sequentially transmitting a number of data sets of the plurality of data sets less than or equal to a number of the planes, from the address of the buffer memory to the page buffer of a plane according to a mapping table, the mapping table mapping the addresses of the buffer memory to the planes; and programming, in parallel, the plurality of data sets from the page buffer to memory cells of the non-volatile memory device according to a physical address corresponding to the logical address associated with the data set.

BRIEF DESCRIPTION OF THE DRAWINGS

The above and other features and advantages of the inventive concepts will become more apparent by describing in detail exemplary embodiments thereof with reference to the attached drawings in which:

FIG. 10B is a schematic timing chart showing the program operation of the memory system illustrated in FIG. 10A;

DETAILED DESCRIPTION OF THE EMBODIMENTS

Figure 1:
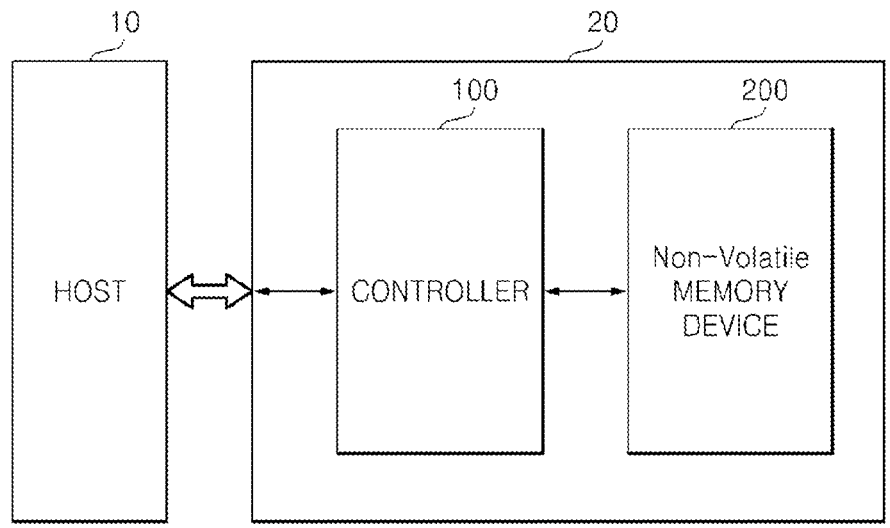
FIG. 1 is a block diagram of a host and a memory system according to some embodiments of the inventive concepts.

The inventive concepts now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
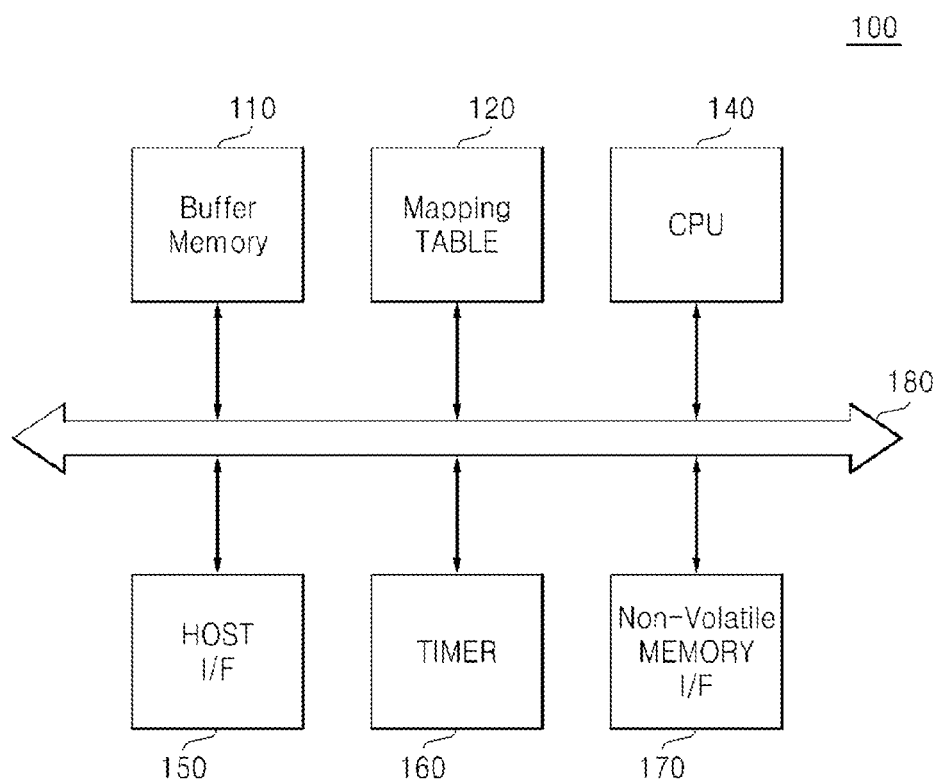
FIG. 2 is a detailed block diagram of a memory controller illustrated in FIG. 1.

FIG. 1 is a block diagram of a host 10 and a memory system 20 according to some embodiments of the inventive concepts. FIG. 2 is a detailed block diagram of a memory controller 100 illustrated in FIG. 1.

Referring to FIG. 1, the memory system 20 connected to the host 10 includes a memory controller 100 and at least one non-volatile memory device 200. The memory system 20 may be any system that includes non-volatile memory.

The memory controller 100 generates an address and a command (e.g., a program command, a read command, or an erase command) to control the operation (e.g., a program operation, a read operation, or an erase operation) of the non-volatile memory device 200 (e.g., a flash memory device). The program and read operations may be performed in units of pages. The erase operation may be performed in units of blocks.

The memory controller 100 outputs the command CMD for controlling the operation of the non-volatile memory device 200 to the non-volatile memory device 200.

The non-volatile memory device 200 performs an operation in response to the command CMD and sends a result of the operation to the memory controller 100. The non-volatile memory device 200 is connected with the memory controller 100 through an input/output (I/O) pin through which a command CMD, data DATA, an address signal ADD, a status signal and so on may be transceived. Hereinafter, the description of the embodiments of the present invention will be made mainly regarding the program operation.

The memory controller 100 and the non-volatile memory device 200 may be packaged in separate packages, respectively, or in a single package.

Referring to FIG. 2, the memory controller 100 may include a buffer memory 110, a mapping table 120, a central processing unit (CPU) 140, a host interface 150, a timer 160, and a non-volatile memory interface 170.

The buffer memory 110 may be used as an operation memory of the CPU 140. The buffer memory 110 may also store data that the host 10 requests the non-volatile memory device 200 to program. The buffer memory 110 may be implemented by DRAM or SRAM.

Figure 11:
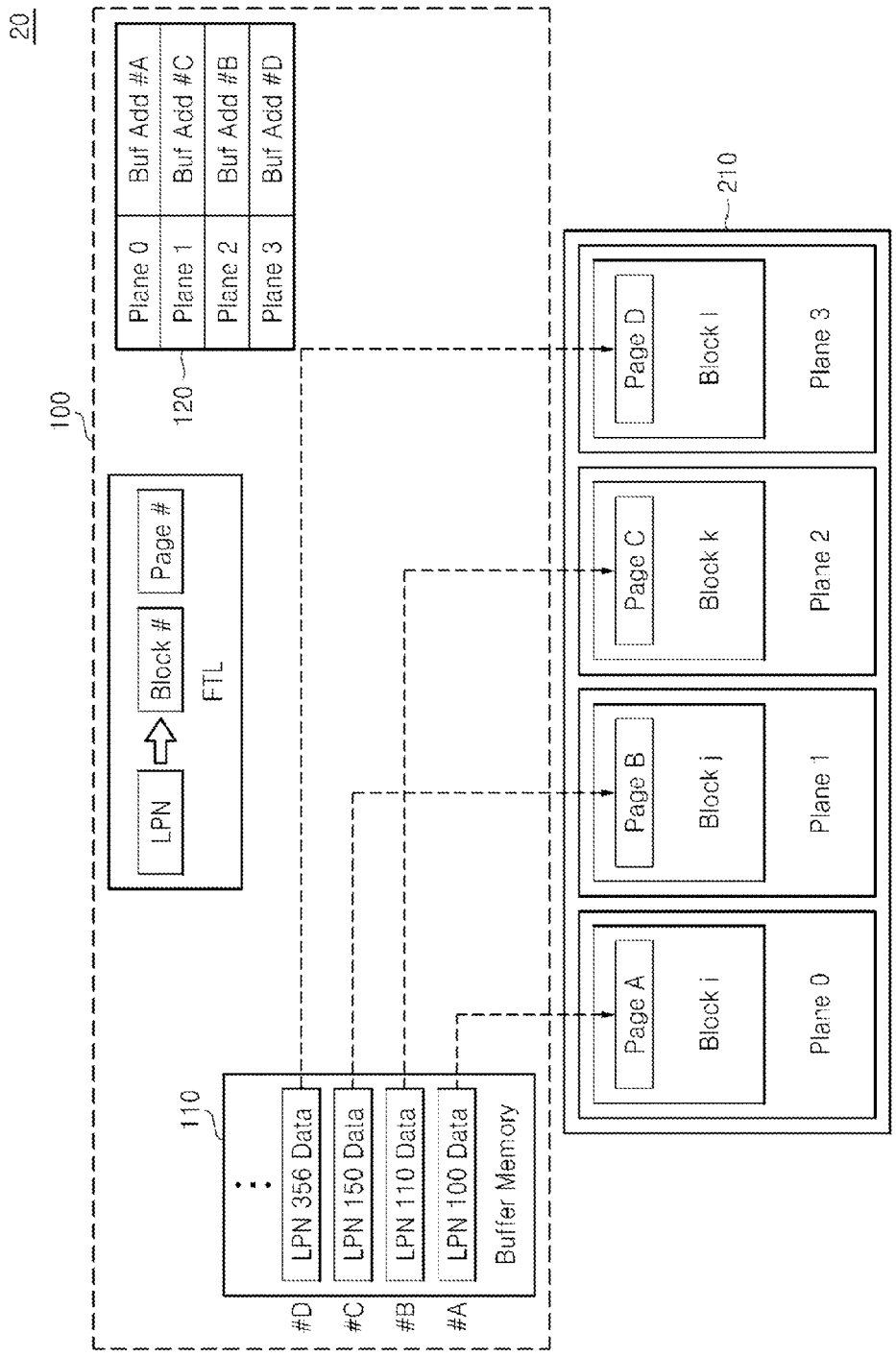
FIG. 11 is a detailed block diagram of the program operation illustrated in FIG. 8.

The mapping table 120 stores buffer address information of the buffer memory 110 mapped to a plane of the non-volatile memory device 200. For instance, when the non-volatile memory device 200 has a four-plane architecture, as shown in FIG. 11 the mapping table 120 may store a buffer address BufAdd#A corresponding to a first plane Plane0, a buffer address BufAdd#C corresponding to a second plane Plane1, a buffer address BufAdd#B corresponding to a third plane Plane2, and a buffer address BufAdd#D corresponding to a fourth plane Plane3.

The mapping information may be updated every time when data received from the host 10 is stored in the buffer memory 110. The mapping table 120 is separately illustrated in the drawings, but it may be implemented in the DRAM or SRAM. That is, the mapping table 120 may be implemented in the buffer memory 110.

The CPU 140 may control data transmission through a bus 180 among the buffer memory 110, the host interface 150, the timer 160, and the non-volatile memory interface 170. The CPU 140 may also drive a flash translation layer (FTL).

The FTL may keep the mapping information between a logical address in a virtual block device (e.g., a host) and a physical address in a non-volatile memory device, and when a program or read operation is requested with respect to a particular logical address, it may translate the logical address into a physical address using the mapping information. Especially, when a program operation that changes data at a particular logical address is requested, the FTL may electrically erase a physical address corresponding to the logical address and then rewrite the physical address or remap the logical address to a different physical address.

The host interface 150 may interface the host 10 and the memory controller 100 for data transmission according to a protocol of the host 10 connected to the memory system 20.

The timer 160 provides the CPU 140 time information necessary for the operation of the memory controller 100. The non-volatile memory interface 170 may interface the non-volatile memory device 200 and the memory controller 100 for data transmission.

The memory controller 100 may also include an error correction code (ECC) block (not shown). The ECC block may detect and correct errors in data read from the non-volatile memory device 200.

Figure 3:
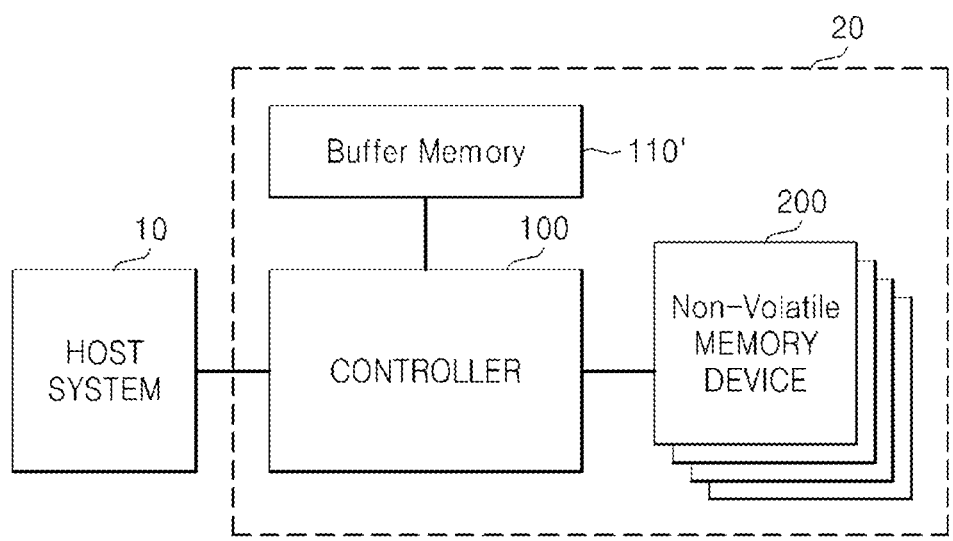
FIG. 3 is a block diagram of a host and a memory system according to other embodiments of the inventive concepts.

FIG. 3 is a block diagram of the host 10 and the memory system 20 according to other embodiments of the inventive concepts. Referring to FIG. 3, a buffer memory 110' may be implemented to be separated from the memory controller 100. Only one non-volatile memory device 200 is illustrated in FIG. 1, but a plurality of non-volatile memory devices 200 may be connected to the memory controller 100 in the embodiments illustrated in FIG. 3.

Figure 4:
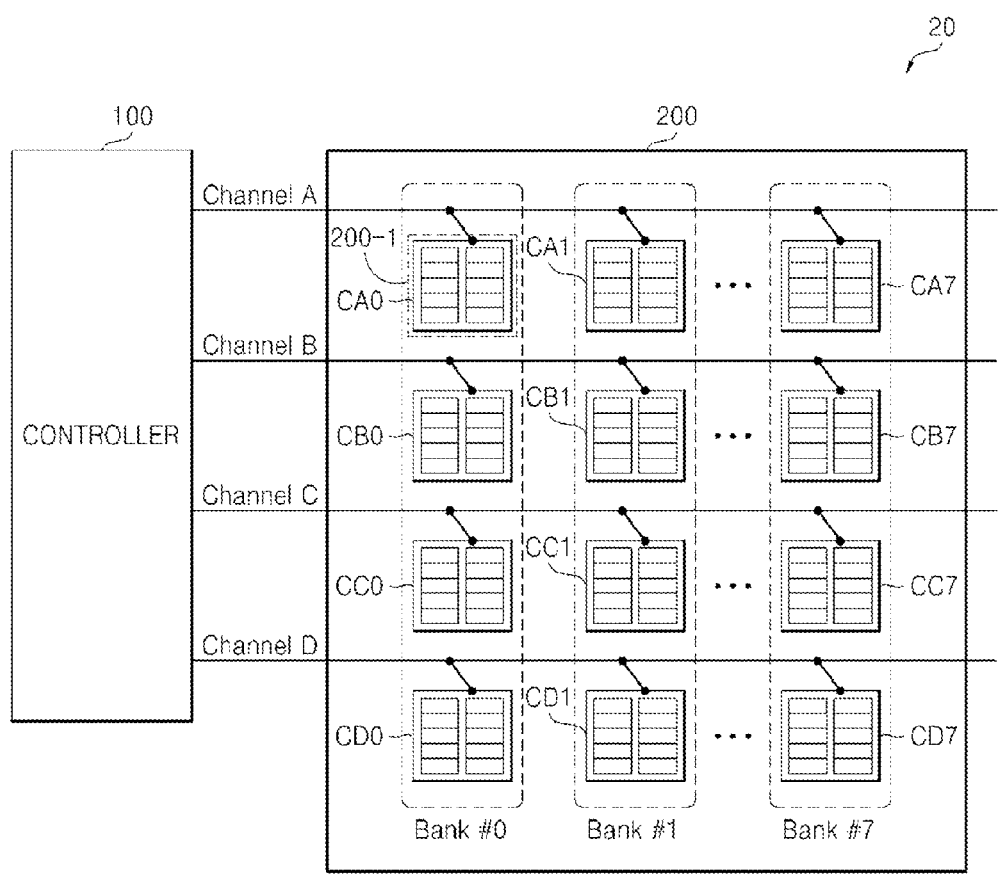
FIG. 4 is a block diagram of the structure of the memory system illustrated in FIG. 1 according to some embodiments of the inventive concepts.

FIG. 4 is a block diagram of the structure of the memory system 20 illustrated in FIG. 1 according to some embodiments of the inventive concepts. Referring to FIG. 4, the non-volatile memory device 200 may include a plurality of memory elements 200-1. FIG. 4 shows the embodiments in which the non-volatile memory device 200 has a 4-channel 8-bank structure, but the inventive concepts are not restricted to the current embodiments.

In the memory system 20 illustrated in FIG. 4, the memory controller 100 and the non-volatile memory device 200 are connected through four channels A, B, C, and D. Eight flash memory elements CA0 through CA7, CB0 through CB7, CC0 through CC7, or CD0 through CD7 are connected to a corresponding one of the channels A, B, C, and D. However, it is apparent that the numbers of channels and banks may be changed. Here, a bank is a group of memory elements positioned at the same offset in different channels.

Each of the flash memory elements 200-1 has 2-plane architecture in the embodiments illustrated in FIG. 4, but the inventive concepts are not restricted to the current embodiments. The number of planes may be changed.

Figure 5:
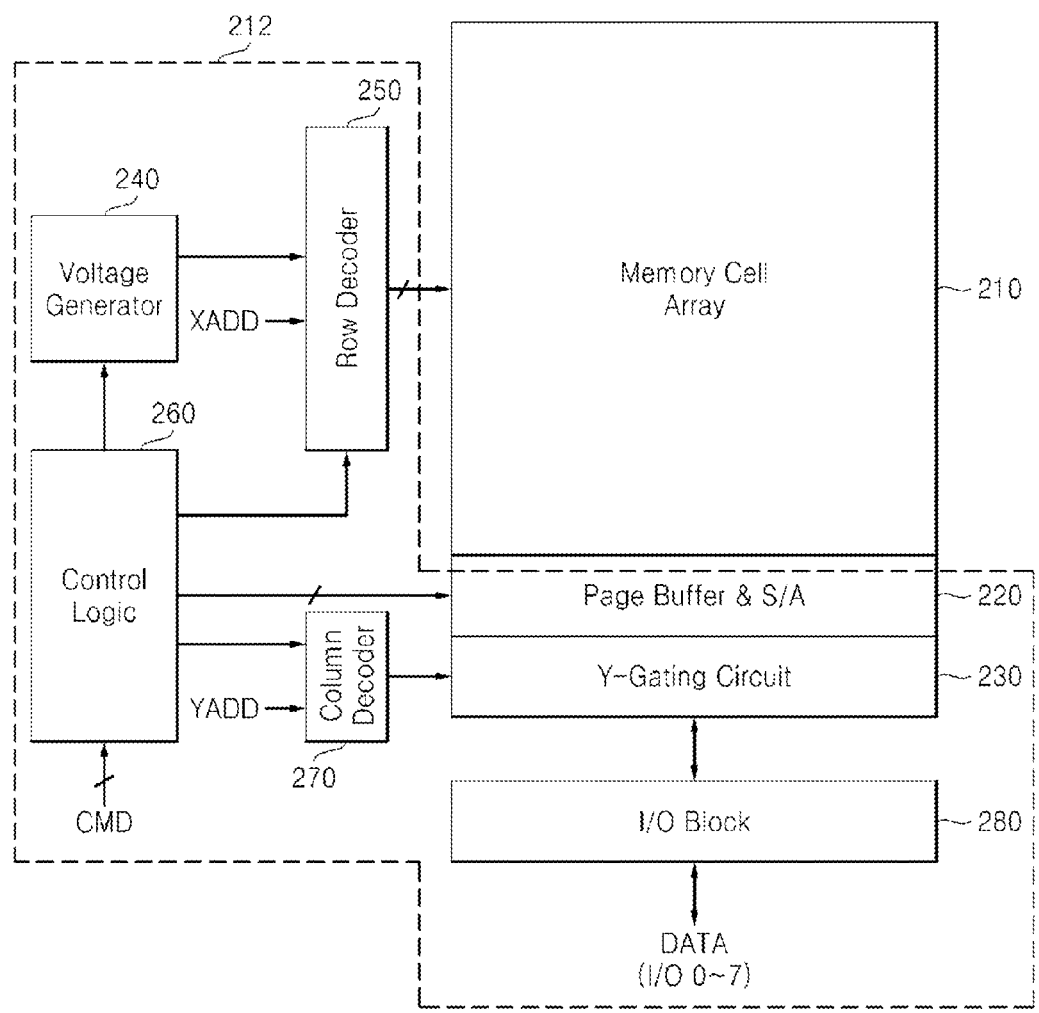
FIG. 5 is a detailed block diagram of a non-volatile memory device illustrated in FIG. 1.

FIG. 5 is a detailed block diagram of the non-volatile memory device 200 illustrated in FIG. 1. When the non-volatile memory device 200 includes a plurality of memory elements 200-1 as shown in FIG. 4, each of the plurality of memory elements 200-1 may be implemented as shown in FIG. 5.

Figure 6A:
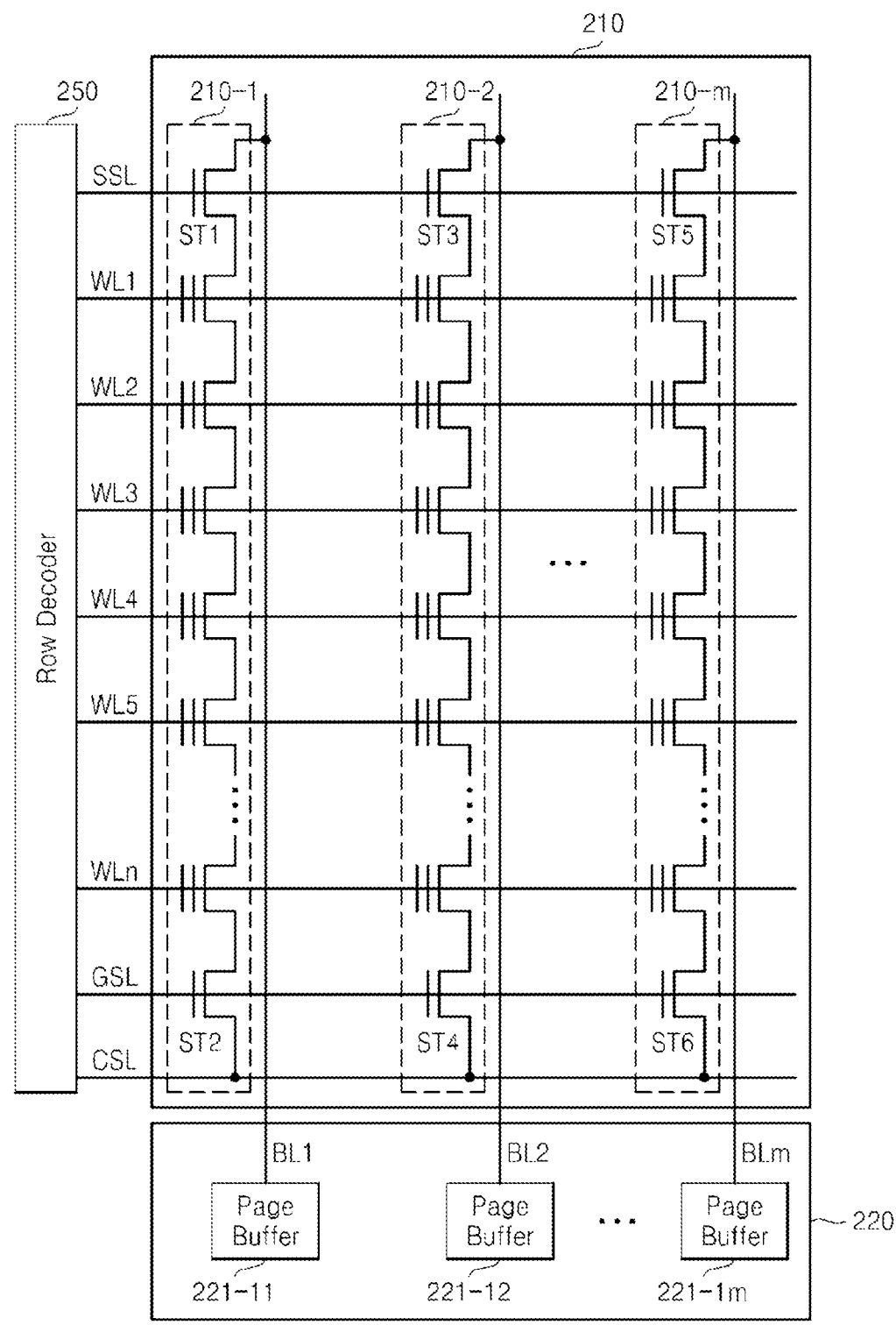
FIG. 6A is a diagram of a memory cell array illustrated in FIG. 5 according to some embodiments of the inventive concepts.
Figure 6B:
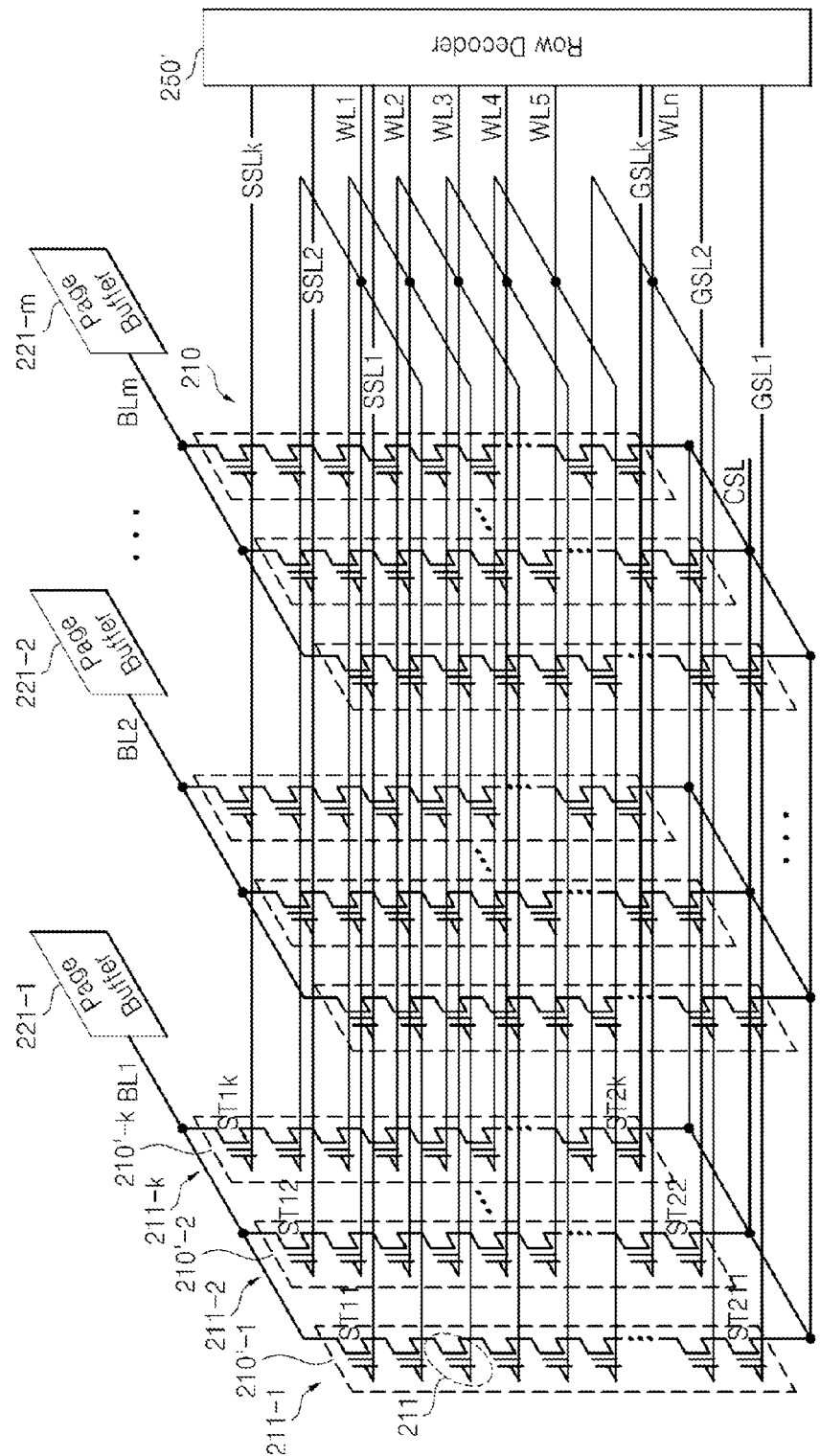
FIG. 6B is a diagram of the memory cell array illustrated in FIG. 5 according to other embodiments of the inventive concepts.

FIG. 6A is a diagram of a memory cell array 210 illustrated in FIG. 5 according to some embodiments of the inventive concepts. FIG. 6B is a diagram of the memory cell array 210 illustrated in FIG. 5 according to other embodiments of the inventive concepts.

Referring to FIG. 5, the non-volatile memory device 200 includes a memory cell array 210 and an access circuit 212.

The memory cell array 210 includes NAND memory cell strings respectively connected to bit lines. Each of the NAND memory cell strings includes a plurality of non-volatile memory cells connected in series to one another. Each NAND memory cell string may be laid out (or embodied) on one plane (or layer) in two dimensions as illustrated in FIG. 6A. Alternatively, the memory cell array 210 may be implemented in three dimensions, as illustrated in FIG. 6B, using a wafer stack, a chip stack, or a cell stack.

Referring to FIGS. 6A and 6B, the NAND memory cell string includes the non-volatile memory cells connected in series between a string selection transistor ST1 connected to one of the bit lines and a ground selection transistor ST2 connected to a common source line (CSL).

A gate of the string selection transistor ST1 is connected to a string selection line (SSL). Gates of the respective non-volatile memory cells are connected to a plurality of word lines WL1 through WLn, respectively. A gate of the ground selection transistor ST2 is connected to a ground selection line (GSL). Each NAND memory cell string is connected to one of page buffers 221-11 through 211-1m or 221-1 through 221-m. The number of word lines WL1 through WLn may vary with different embodiments.

The non-volatile memory cells included in the NAND memory cell strings may be implemented using flash electrically erasable programmable read-only memory (EEPROM) which can store one or more bits.

Accordingly, each of the non-volatile memory cells may be embodied by a NAND flash memory cell storing at least one bit, e.g., a single level cell (SLC) or a multi-level cell (MLC).

The access circuit 212 accesses the memory cell array 210 to perform a data access operation, e.g., a program operation, a read operation, or an erase operation, according to a command (or command sets) and an address received from an outside, e.g., the memory controller 100. The access circuit 212 includes a voltage generator 240, a row decoder 250, a control logic 260, a column decoder 270, a page buffer and sense amplifier (S/A) block 220, a Y-gating circuit 230, and an I/O block 280.

The voltage generator 240 may generate a voltage necessary for a data access operation in response to a control signal generated by the control logic 260. The voltage generator 240 generates a program voltage and a program-verify voltage necessary to perform the program operation, generates a plurality of read voltages necessary to perform the read operation, generates an erase voltage and an erase-verify voltage necessary to perform the erase operation, and output the voltages necessary for each of the operations to the row decoder 250.

The control logic 260 controls the overall operation of the access circuit 212 in response to the command CMD output from the memory controller 100. The control logic 260 may control memory read state information to be sensed during a memory read operation and data that has been read to be output to the memory controller 100.

Under the control of the control logic 260, the column decoder 270 decodes a column address YADD and outputs a plurality of select signals to the Y-gating circuit 230.

The page buffer and S/A block 220 includes a plurality of page buffers PB. The page buffers PB are respectively connected with a plurality of bit lines.

Each of the page buffers PB may operate as drivers that temporarily store data read from the memory cell array 210 in the read operation according to the control of the control logic 260. Each page buffer PB may also operate as an S/A which senses and amplifies a voltage of each bit line during the read operation according to the control of the control logic 260.

The Y-gating circuit 230 may control transmission of data between the page buffer and S/A block 220 and the I/O block 280 in response to the select signals received from the column decoder 270.

The I/O block 280 may transmit data from an outside to the Y-gating circuit 230 or transmit data from the Y-gating circuit 230 to the memory controller 100 through a plurality of I/O pins (or a data bus).

Figure 7A:
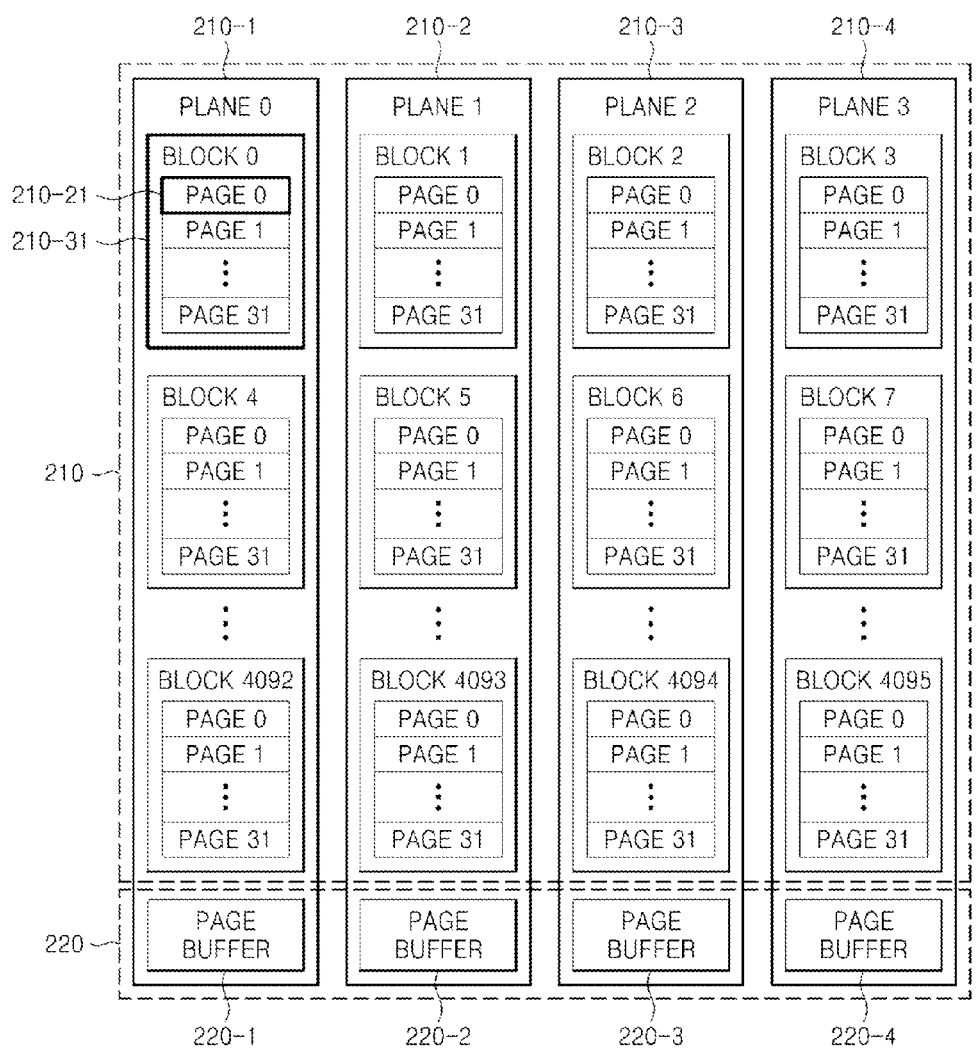
FIG. 7A is a block diagram showing the memory cell array illustrated in FIG. 5 in multi-plane units according to some embodiments of the inventive concepts.
Figure 7B:
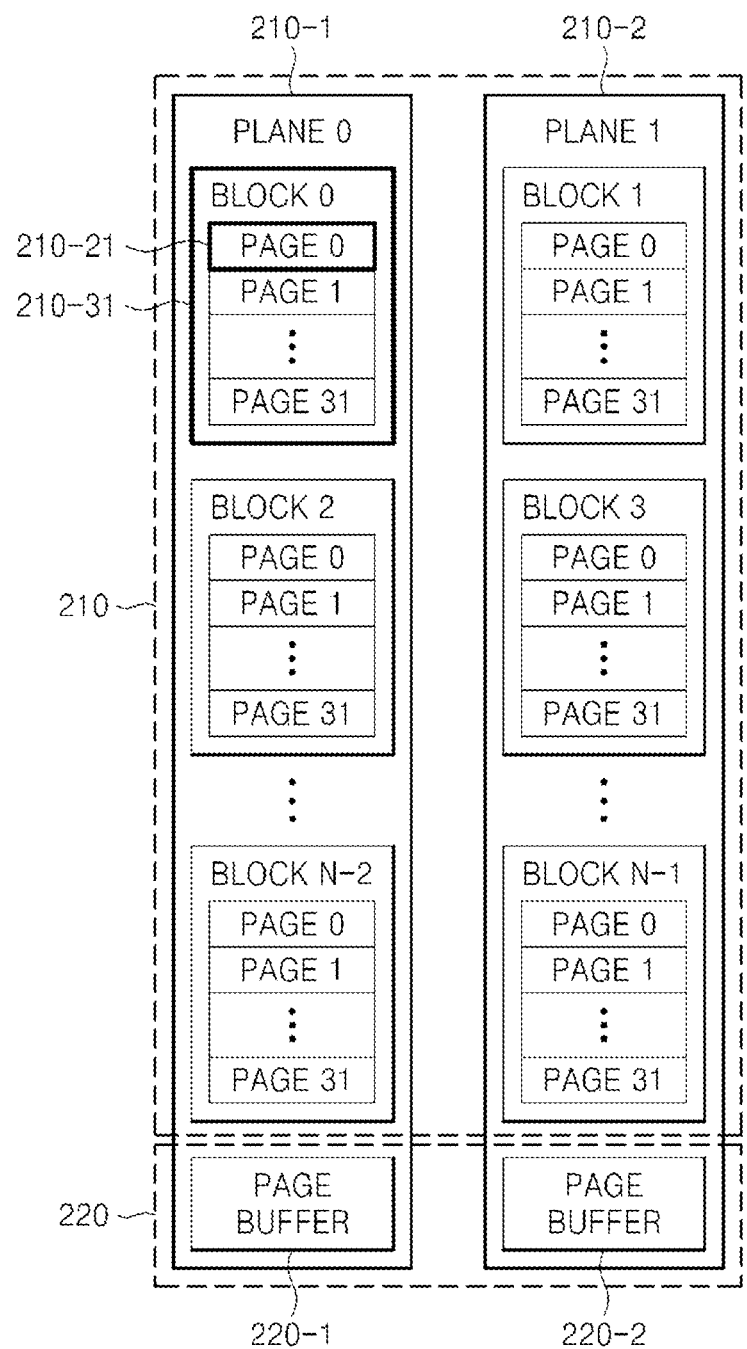
FIG. 7B is a block diagram showing the memory cell array illustrated in FIG. 5 in multi-plane units according to other embodiments of the inventive concepts.

FIG. 7A is a block diagram showing the memory cell array 210 illustrated in FIG. 5 in multi-plane units according to some embodiments of the inventive concepts. FIG. 7B is a block diagram showing the memory cell array 210 illustrated in FIG. 5 in multi-plane units according to other embodiments of the inventive concepts.

Referring to FIG. 7A, the memory cell array 210 includes multiple planes. Here, the multiple planes refer to at least two planes. The memory cell array 210 may be divided into a plurality of memory blocks 210-31, i.e., BLOCK0 through BLOCKk (where "k" is a natural number greater than 0). In the embodiments illustrated in FIG. 7A, the non-volatile memory blocks 210-31 are uniformly distributed to four memory planes 210-1, 210-2, 210-3, and 210-4. Each of the memory blocks 210-31 includes a plurality of pages 210-21.

Page buffers 220-1 through 220-4 are respectively provided for the planes 210-1 through 210-4, so that one memory block 220-31 or one page 220-21 is selected from each of the planes 210-1 through 210-4 and a maximum of "n" memory blocks 220-31 or pages 220-21 are subjected to the erase operation or the program/read operation. The "n" memory blocks 220-31 respectively have unique memory block numbers 0, 1, 2, . . . , n−1, so that the memory blocks 210-31 can be individually selected and erased electrically. Each page 210-21 can be individually selected by an address and programmed or read.

The size of memory blocks and pages may vary with NAND flash products. For instance, when a flash memory has a total capacity of 16 Mbytes, a memory block size of 16 Kbytes, and a page size of 512 bytes, it is comprised of 1024 memory blocks, each of which is comprised of 32 pages.

A non-volatile memory device includes 4096 memory blocks distributed to four planes and each memory block includes 32 pages in the current embodiments, but the inventive concepts are not restricted to the current embodiments. A non-volatile memory device having a different multi-plane architecture as shown in FIG. 7B may be used.

Referring to FIGS. 7A and 7B, the plane 210-1 includes at least one memory array and a page buffer 220-1 positioned at an end of the memory array. The page buffer 220-1 stores data of a single page 210-21. Each memory array has the basic structure of a non-volatile memory, a shown in FIG. 6A or 6B.

The row decoder 250 may be provided for each of the planes 210-1 through 210-4.

Figure 8:
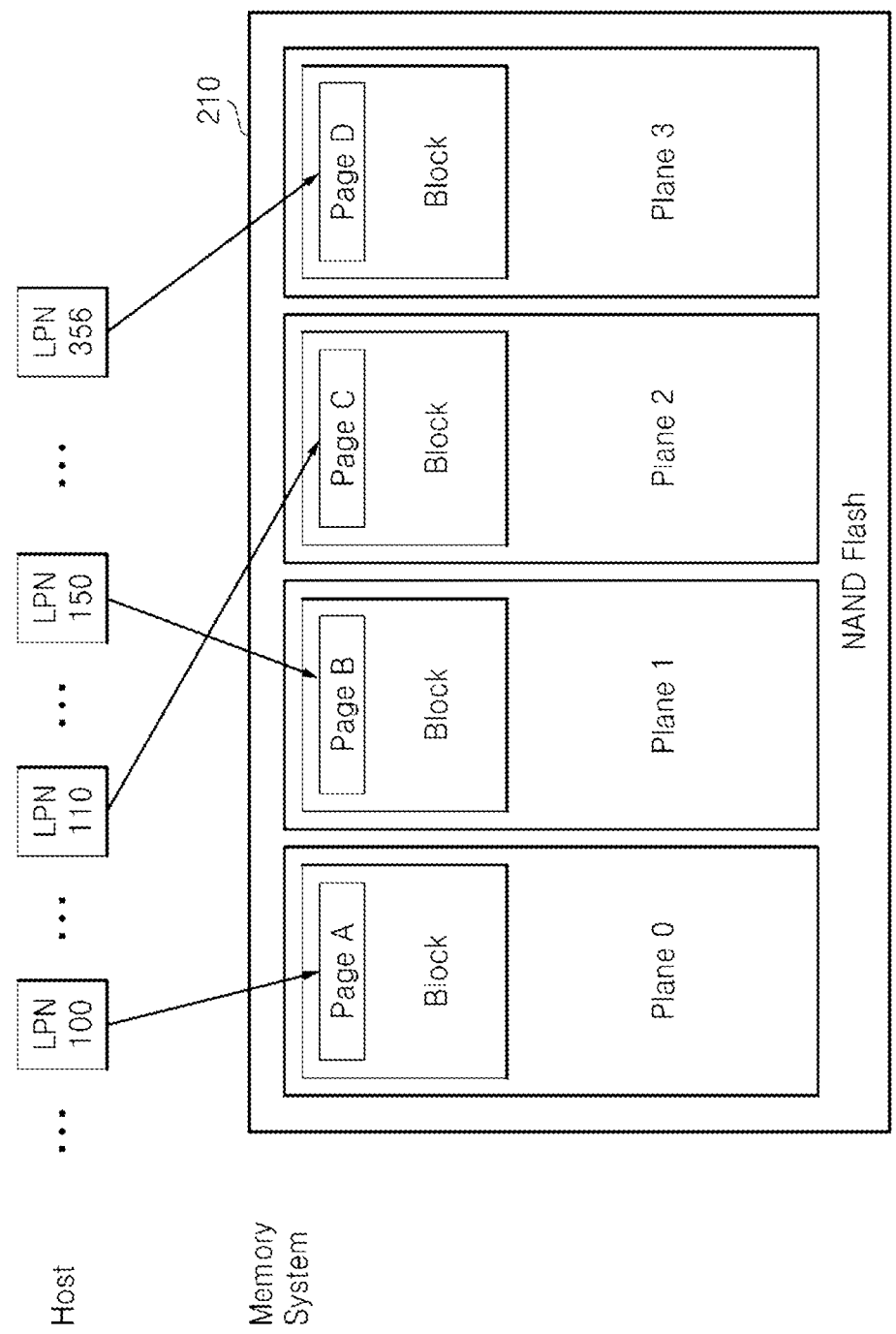
FIG. 8 is a diagram for explaining a procedure for programming data from a memory controller to a non-volatile memory device according to some embodiments of the inventive concepts.
Figure 9:
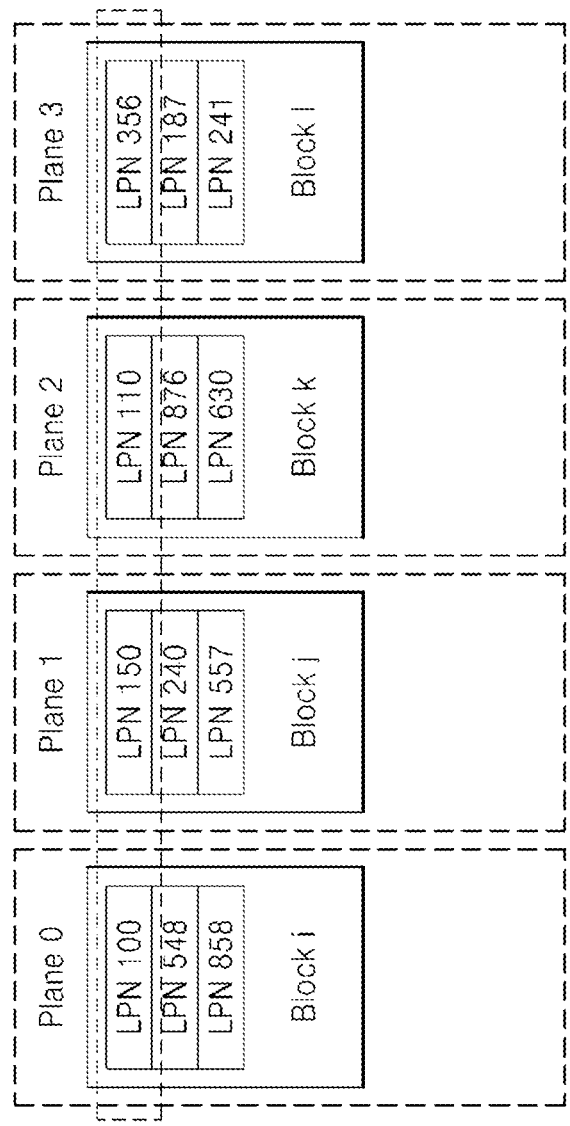
FIG. 9 is a block diagram showing the data, which is programmed to the non-volatile memory device illustrated in FIG. 8, in units of planes and pages.

FIG. 8 is a diagram for explaining a procedure for programming data from the memory controller 100 to the non-volatile memory device 200 according to some embodiments of the inventive concepts. FIG. 9 is a block diagram showing the data, which is programmed to the non-volatile memory device 200 illustrated in FIG. 8, in units of planes and pages.

The host 10 sends data of a plurality of pages 210-21 and a write request to the memory system 20. The data may have sequential logical addresses like moving image data, but it is assumed in the embodiments that the data have unsequential or random logical addresses. In other words, the write request may be a random write request. Here, when logical addresses are unsequential or random, a series of at least two logical addresses does not have continuity. Even a series of logical addresses that have a single discontinuity thereamong is considered random.

For instance, as shown in FIG. 8, when the host 10 requests the memory system 20 to write data having logical addresses of respective independent regions LPN100, LPN110, LPN150, and LPN356, the memory system 20 receive the data from the host 10 in unsequential order. In other words, when the data is programmed to the non-volatile memory device 200, the logical addresses of the data are not sequential.

The memory system 20 programs the data having unsequential logical addresses to the non-volatile memory device 200 using a multi-plane program method.

For instance, the data of LPN100, the data of LPN110, the data of LPN150, and the data of LPN356 may be programmed in parallel to Page A in a block "i" of Plane0, Page C in a block "k" of Plane2, Page B in a block "j" of Plane1, and Page D in a block "l" of Plane3, respectively, using the multi-plane program method.

It is illustrated that the memory blocks and pages in which the data are programmed are in a row in FIG. 8, but the inventive concepts are not restricted to the current embodiments. They may be in different positions in different planes.

When the host 10 sends the data having the unsequential logical addresses to the memory system 20, the memory controller 100 receives the data and transmits the data to the non-volatile memory device 200. At this time, the memory controller 100 finds a physical address corresponding to each logical address using the FTL and transmits data corresponding to the logical address to the physical address in the non-volatile memory device 200.

In detail, when the memory controller 100 receives the data of LPN100, LPN110, LPN150, and LPN356, which have unsequential logical addresses, it stores the data in the buffer memory 110 temporarily. Thereafter, the memory controller 100 updates a buffer address of a corresponding plane in the mapping table 120. In the current embodiments, it is assumed that the data received from the host 10 are sequentially stored in Plane0 through Plane 3, respectively, according to the FTL. In this case, the data of the LPN100, LPN150, LPN110, and LPN356 correspond to Plane0, Plane1, Plane2, and Plane3, respectively. Accordingly, when the data of LPN100 is stored in the buffer memory 110, a buffer address of the buffer memory 110, in which the data of LPN100 is stored, is stored corresponding to Plane0 in the mapping table 120. When the data of LPN150 is stored in the buffer memory 110, a buffer address of the buffer memory 110, in which the data of LPN150 is stored, is stored corresponding to Plane1 in the mapping table 120. In the same manner, buffer addresses for the data of LPN110 and LPN356 are stored in the mapping table 120.

The logical addresses of the data are translated into physical addresses, respectively, according to the FTL. Although not shown, an address translation mapping table may be provided to convert a logical address into a physical address.

When the buffer memory 110 is filled with as many data as the number of multiple planes, the memory controller 100 sends a program request and the data to the non-volatile memory device 200. The non-volatile memory device 200 receives the data sequentially. The non-volatile memory device 200 temporarily stores data for a plane corresponding to a physical address in the page buffer and S/A block 220. When data for all planes (e.g., four planes in 4-plane architecture) are stored in the page buffer and S/A block 220, the non-volatile memory device 200 respectively programs the data to pages in respective memory blocks in the respective planes at a time.

For instance, when the data of LPN100, LPN150, LPN110, and LPN356 are stored in respective page buffers in the non-volatile memory device 200, the data are simultaneously programmed to the respective physical addresses. In the same manner, data of LPN548, LPN240, LPN876, and LPN187 and data of LPN858, LPN557, LPN630, and LPN241 are programmed.

Figure 10A:
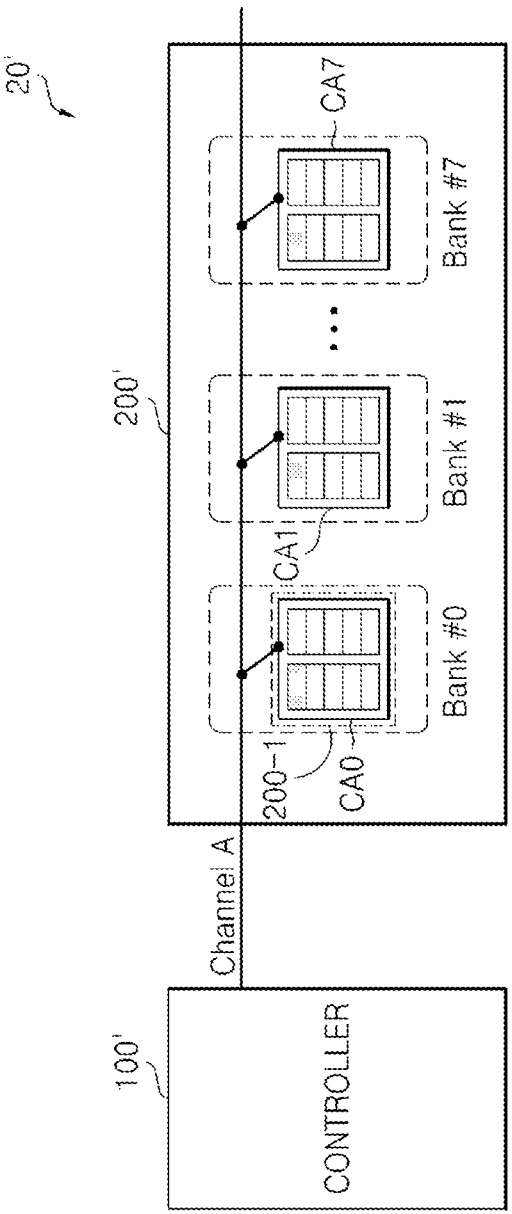
FIG. 10A is a block diagram of the structure of a memory system according to other embodiments of the inventive concepts.

FIG. 10A is a block diagram of the structure of a memory system 20' according to other embodiments of the inventive concepts. FIG. 10B is a schematic timing chart showing the program operation of the memory system 20' illustrated in FIG. 10A. FIG. 10A shows a non-volatile memory device 200' that has a 1-channel 8-bank structure. Each of memory elements CA0 through CA7 has 4-plane architecture, as shown in FIGS. 8 and 9.

Referring to FIGS. 10A and 10B, when the memory system 20' receives a program request from the host 10, a memory controller 100' may perform a program operation on first through eighth banks #0 through #7 sequentially.

For instance, the memory controller 100' may sequentially receive the data respectively corresponding to the logical addresses LPN100, LPN150, LPN110, and LPN356 from the host 10 and store the data in the buffer memory 110. At this time, each datum may be stored with a physical address corresponding to its logical address according to the FTL.

A buffer address of each datum stored in the buffer memory 110 is also stored in the mapping table 120. For instance, a buffer address of the datum having the logical address LPN100 may be stored corresponding to the first plane Plane0 in the mapping table 120, a buffer address of the datum having the logical address LPN150 may be stored corresponding to the second plane Plane1 in the mapping table 120, a buffer address of the datum having the logical address LPN110 may be stored corresponding to the third plane Plane2 in the mapping table 120, and a buffer address of the datum having the logical address LPN356 may be stored corresponding to the fourth plane Plane3 in the mapping table 120.

Accordingly, even when the data have the random logical addresses like LPN100, LPN150, LPN110, and LPN356, the data stored in the buffer memory 110 can be transmitted corresponding to planes, respectively, based on information stored in the mapping table 120.

The data having the logical addresses LPN100, LPN150, LPN110, and LPN356 are transmitted from the buffer memory 110 to the first bank #0 through a channel A. The non-volatile memory device CA0 of the first bank #0 sequentially receives the data having the logical addresses LPN100, LPN150, LPN110, and LPN356 and stores them in the page buffer and S/A block 220 till data for all respective planes are received in a period tDMA and then simultaneously stores the data to pages respectively having physical addresses corresponding to the respective logical addresses LPN100, LPN150, LPN110, and LPN356 in a period tPROG.

During the program operation, the channel A between the memory controller 100' and the non-volatile memory device 200' is empty, and therefore, data can be transmitted to the other banks #1 through #7.

Accordingly, during the program operation tPROG of the first bank #0, the memory controller 100' may transmit a next set of data having logical addresses LPN548, LPN240, LPN876, and LPN187 to the second bank #1 through the channel A.

The non-volatile memory device CA1 of the second bank #1 sequentially receives the data having the logical addresses LPN548, LPN240, LPN876, and LPN187 and stores them in the page buffer and S/A block 220 till data for all respective planes are received in the period tDMA and then simultaneously stores the data to pages respectively having physical addresses corresponding to the respective logical addresses LPN548, LPN240, LPN876, and LPN187 in the period tPROG.

Data having random logical addresses (e.g., LPN858, LPN557, LPN630, and LPN241) are programmed to the other banks #2 through #7 in the same manner as described above.

Thereafter, when the program operation of the first bank #0 is completed, the first bank #0 sequentially receives subsequent data having logical addresses LPN872, LPN178, LPN544, and LPN895 for four respective planes and stores the data in the I/O block 280. When all of the data for the four respective planes are received in the period tDMA, the first bank #0 simultaneously programs the data to physical addresses corresponding to the data in the period tPROG.

As described above, while a program operation is being performed on one bank (e.g., the first bank #0) in the period tPROG, data can be transmitted to another bank (e.g., the second bank #1) through a channel to which the two banks are connected.

Accordingly, a channel idle time, i.e., tPROG-tDMA occurring due to a long programming time tPROG during a program operation on multiple planes is reduced, and a channel is used efficiently. As a result, the program operation performance of the memory system 20' is increased.

FIG. 11 is a detailed block diagram of the program operation illustrated in FIG. 8. Referring to FIG. 11, the memory controller 100 receives a program request and data to be programmed to the non-volatile memory device 200 from the host 10 and temporarily stores the data in the buffer memory 110. At this time, the data may be sequentially or randomly stored in the buffer memory 110, and the logical addresses of the data stored in the buffer memory 110 may not be sequential.

The memory controller 100 may convert the logical address of each datum stored in the buffer memory 110 into a physical address, i.e., a combination of a memory block address and a page address, using an FTL. The memory controller 100 acquires buffer address information of the buffer memory 110 with respect to each plane using the mapping table 120. Mapping information between a buffer address and a plane may be updated in the mapping table 120 every time when a datum is stored in the buffer memory 110.

In some embodiments, each datum that has acquired the buffer address is sequentially transmitted to a page buffer (not shown) of a plane corresponding to the buffer address and is temporarily stored in the page buffer until data for all of the planes, respectively, are stored in corresponding page buffers, respectively. When data for all four planes are stored in the respective page buffers, the non-volatile memory device 200 simultaneously stores the data in memory cells corresponding to the memory block addresses and the page addresses.

In other embodiments, the memory controller 100 may perform a multi-plane operation even when the memory system 20 operates using write-through. The write-through is an operation of storing data immediately, so that data is stored in the non-volatile memory device 200 even when as many data as the number of planes are not stored in the buffer memory 110.

The memory controller 100 may count a duration, i.e., "current time—start time" using the timer 160 while storing data received from the host 10 in the buffer memory 110 in order to prepare for the write-through.

When the duration exceeds a desired (or, alternatively a predetermined) time limit, even if the number of data stored in the buffer memory 110 is less than the number of multiple planes, the memory controller 100 transmits the data to the non-volatile memory device 200. When each datum has been received in a corresponding plane, the non-volatile memory device 200 simultaneously program the data to memory cells corresponding to the memory block addresses and the page addresses.

The memory controller 100 and the non-volatile memory device 200 repeat the program operation in such a multi-plane architecture as described above according to the request of the host 10.

As described above, the mapping table 120 manages a buffer address corresponding to each plane. Accordingly, data in the buffer memory 110 can be independently transmitted to page buffers of the respective planes. As a result, the data having logical addresses that are not sequential is programmed to multi-plane memory using a multi-plane operation, so that a channel between the memory controller 100 and the non-volatile memory device 200 is used efficiently. In addition, since a unit capacity of data programmed at a time is increased, the performance of the memory system 20 is increased without increasing a write amplification factor (WAF).

Moreover, the increase of the performance of the memory system 20 can be promoted during garbage collection as well as a program operation performed at the random write request of the host 10. The garbage collection is a process of managing invalid pages and valid pages in order to optimize the use of the non-volatile memory device 200. The garbage collection process will be described in detail with reference to FIG. 14 later.

For clarity of the description, a multi-plane program operation in 4-plane architecture will be described, but the inventive concepts are not restricted thereto and can be realized in a memory system having different multi-plane architectures.

Figure 12:
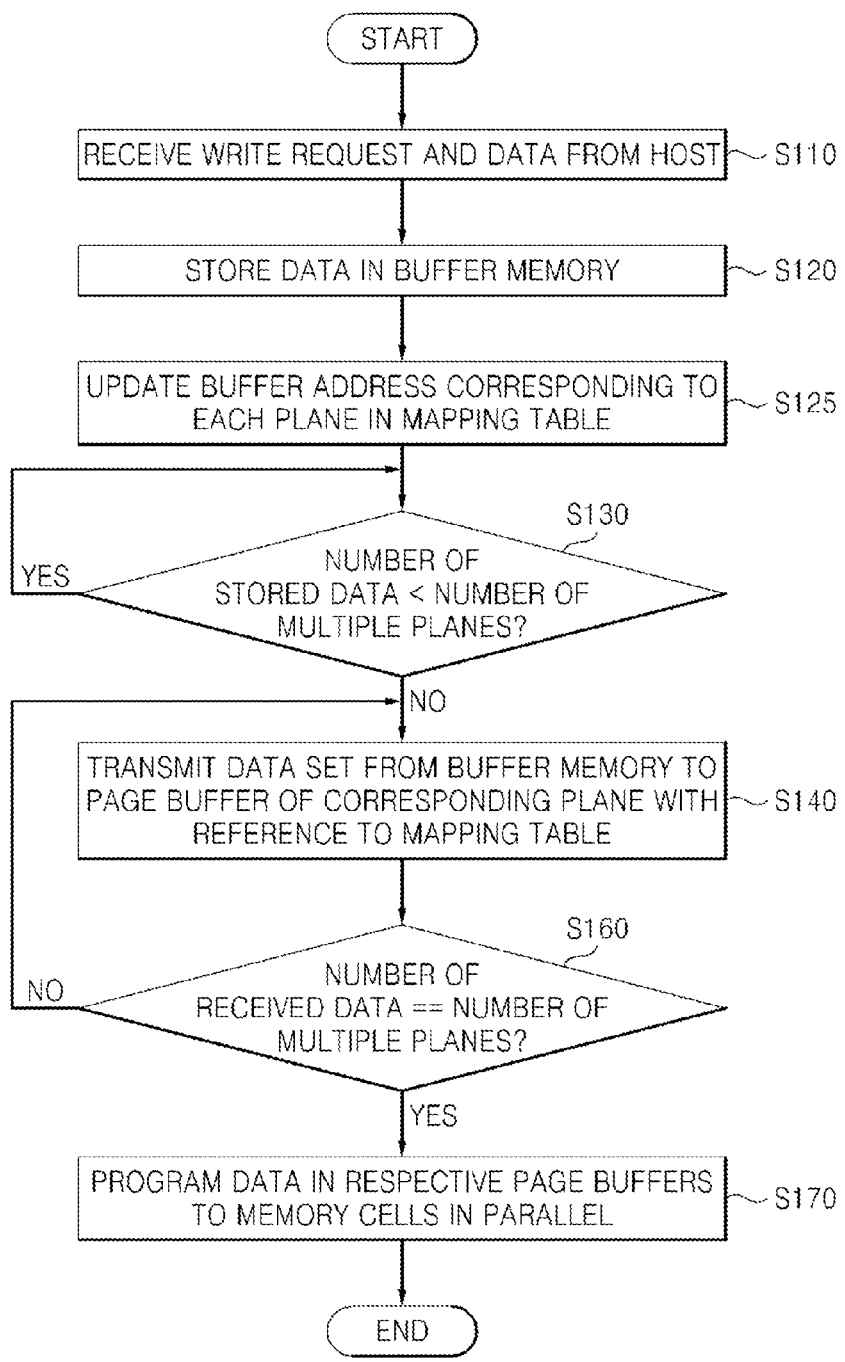
FIG. 12 is a flowchart of a memory control method according to some embodiments of the inventive concepts.

FIG. 12 is a flowchart of a memory control method according to some embodiments of the inventive concepts. Referring to FIG. 12, the memory controller 100 receives a write request and data to be programmed to the non-volatile memory device 200 from the host 10 in operation S110. The write request may include an identifier that identifies a request as the write request, a logical address, and a count. The count indicates the amount of data (e.g., the number of pages or sectors).

The memory controller 100 stores the data in the buffer memory 110 in operation S120. The data may be a data set including at least one bit and may be a write unit, i.e., a page unit.

Next, a buffer address corresponding to a current plane is updated in the mapping table 120 in operation S125. In the non-volatile memory device 200 having the 4-plane architecture, data input to the buffer memory 110 may be sequentially mapped to the first to fourth planes Plane0 to Plane3 in the non-volatile memory device 200. For instance, according to the strategy of the memory controller 100, a data set received first may be mapped to Plane0, the next data set may be mapped to Plane1, and the next data set may be mapped to Plane2.

In this manner, the memory controller 100 receives the data to be programmed from the host 10 together with the write request until the buffer memory 110 is filled with as many data as the number of multiple planes in operation S130.

When as many data as the number of multiple planes are stored in the buffer memory 110, the data in the buffer memory 110 are sequentially transmitted to the page buffer and S/A block 220 of the non-volatile memory device 200 with reference to the mapping table 120 in operations S140 and S160. For instance, a data set stored at a buffer address of Plane0 is transmitted to and stored in a page buffer of Plane0 with reference to the mapping table 120 using direct memory access (DMA) in operation S140, and it is checked whether the number of data transmitted to the page buffer and S/A block 220 is the same as the number of planes in operation S160. When the number of data transmitted to the page buffer and S/A block 220 is not the same as (i.e., is less than) the number of planes, a data set stored at a buffer address of Plane1 is transmitted to and stored in a page buffer of Plane1 with reference to the mapping table 120 using DMA in operation S140.

When the page buffers of all respective planes receive data, respectively, in operation S160, the non-volatile memory device 200 programs in parallel the data stored in the respective page buffers to memory cells having physical addresses, which have been obtained through the FTL, in operation S170.

When the non-volatile memory device 200 has the 4-plane architecture, a 4-plane program operation in which pages are respectively programmed to four planes at a time is performed in operation S170.

Figure 13A:
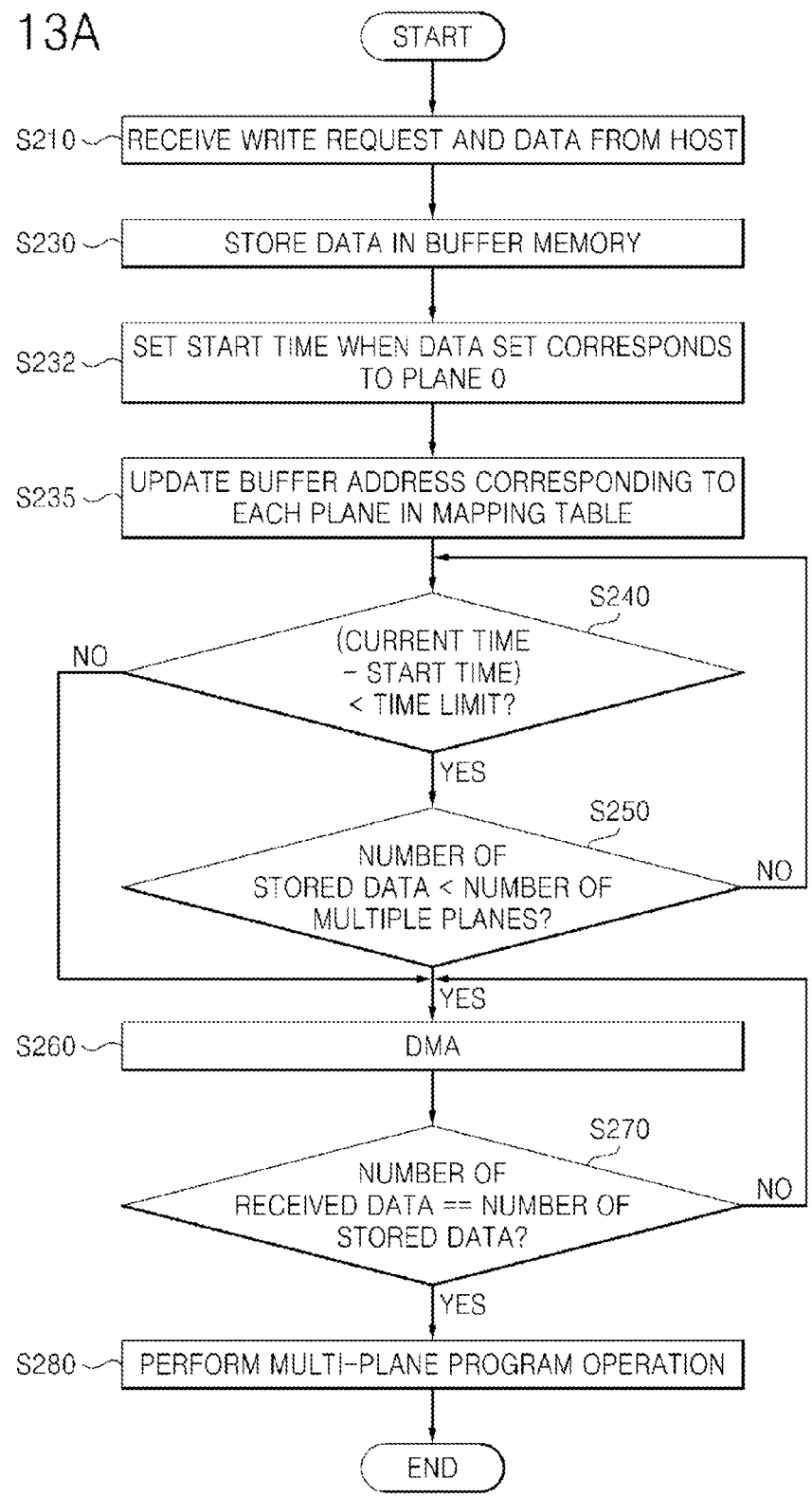
FIG. 13A is a flowchart of a memory control method according to other embodiments of the inventive concepts.

FIG. 13A is a flowchart of a memory control method according to other embodiments of the inventive concepts. Referring to FIG. 13A, the memory controller 100 receives a write request and data to be programmed to the non-volatile memory device 200 from the host 10 in operation S210. At this time, the logical addresses of the data may not be sequential.

The memory controller 100 stores the data in the buffer memory 110 in operation S230. The data may be a data set including at least one bit and may be a write unit, i.e., a page unit.

When a data set stored in the buffer memory 110 corresponds to Plane0, i.e., a start plane in a multi-plane program operation, the memory controller 100 may set a start time in operation S232. For instance, the memory controller 100 may activate the timer 160 or set the time of the timer 160 as a start time in response to the data set corresponding to Plane0.

The memory controller 100 may perform a multi-plane operation even when the memory system 20 operates using write-through. The write-through is an operation of storing data immediately, so that unlike in the embodiments illustrated in FIG. 12, data is stored in the non-volatile memory device 200 even when as many data as the number of planes are not stored in the buffer memory 110.

The memory controller 100 may count "current time—start time" while storing data received from the host 10 in the buffer memory 110 in order to prepare for the write-through.

When the "current time—start time" exceeds a desired (or, alternatively a predetermined) time limit in operation S240, even if the number of data stored in the buffer memory 110 is less than the number of multiple planes, the memory controller 100 transmits the data to the non-volatile memory device 200 in operations S260 and S270. When the number of data stored in the buffer memory 110 is the same as the number of planes within the desired (or, alternatively the predetermined) time limit in operation S250, like in the embodiments illustrated in FIG. 12 as many data as the number of planes are sequentially transmitted to the non-volatile memory device 200 in operations S260 and S270.

When the number of data stored in the page buffer and S/A block 220 of the non-volatile memory device 200 is the same as the number of data stored in the buffer memory 110 in operation S270, the non-volatile memory device 200 programs in parallel the data stored in the page buffer and S/A block 220 to memory cells having physical addresses, which have been obtained through the FTL, in operation S280.

A 4-plane program operation in which pages are respectively programmed to four planes at a time may be performed in operation S280.

For instance, when data for only three planes are received in the time limit, the 4-plane program operation is still performed. In this case, Plane0 through Plane2 may be programmed with valid data received from the host 10 and Plane3 may be programmed with invalid data that has already been stored in a page buffer of Plane3.

Figure 13B:
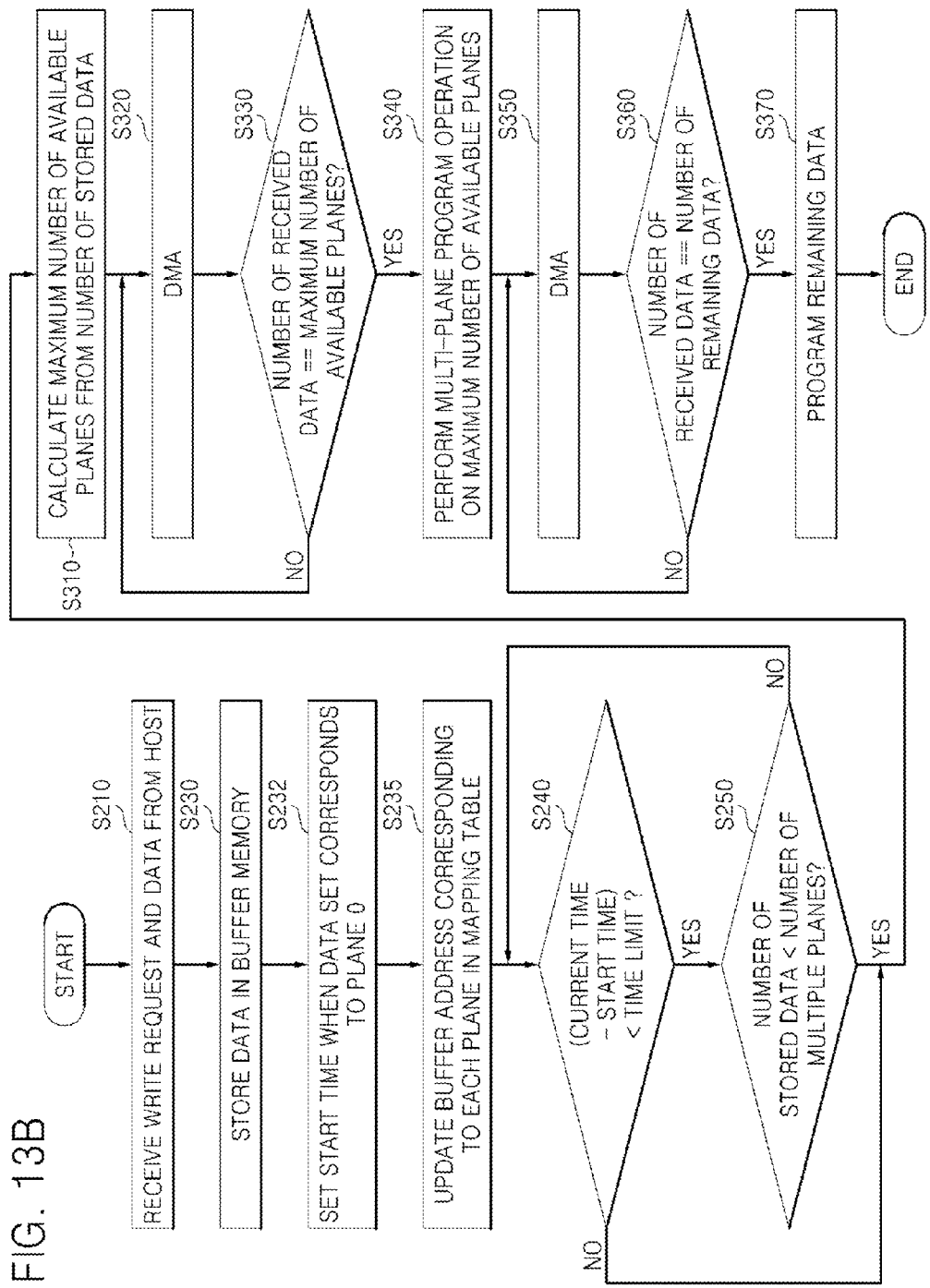
FIG. 13B is a memory control method according to further embodiments of the inventive concepts.

FIG. 13B is a memory control method according to further embodiments of the inventive concepts. Since the embodiments illustrated in FIG. 13B is similar to those illustrated in FIG. 13A, differences therebetween will be mainly described.

Referring to FIG. 13B, when the "current time—start time" exceeds the desired (or, alternatively the predetermined) time limit, that is, NO in operation S240 or when the number of data stored in the buffer memory 110 is the same as the number of multiple planes, that is, YES in operation S250, the data stored in the buffer memory 110 are transmitted to the page buffer and S/A block 220 of the non-volatile memory device 200.

In the embodiments of the inventive concepts, the number of planes that the non-volatile memory device 200 can program data to at a time may be limited. For instance, it is assumed that the non-volatile memory device 200 performs a 1-plane program operation, a 2-plane program operation, and a 4-plane program operation but does not perform a 3-plane program operation.

In this case, the memory controller 100 calculates the maximum number of available planes from the number of data stored in the buffer memory 110 in operation S310. For instance, when the number of data stored in the buffer memory 110 is 3, the maximum number of available planes is 2. The maximum number of available planes is a maximum value among values (e.g., 1 and 2) less than the number (e.g., 3) of data stored in the buffer memory 110 among the numbers (e.g., 1, 2, and 4) of planes that the non-volatile memory device 200 can perform a program operation on simultaneously.

Next, the memory controller 100 sequentially transmits as many data as the maximum number of available planes from the buffer memory 110 to pages buffers, respectively, of the non-volatile memory device 200 in operations S320 and S330.

Next, a multi-plane program operation is performed on planes as many as the maximum number of available planes in operation S340. For instance, two planes are subjected to a program operation at a time.

Next, the memory controller 100 transmits a data set remaining in the buffer memory 110 to a corresponding page buffer in the non-volatile memory device 200 in operations S350 and S360 and programs all remaining data in operation S370.

Figure 14:
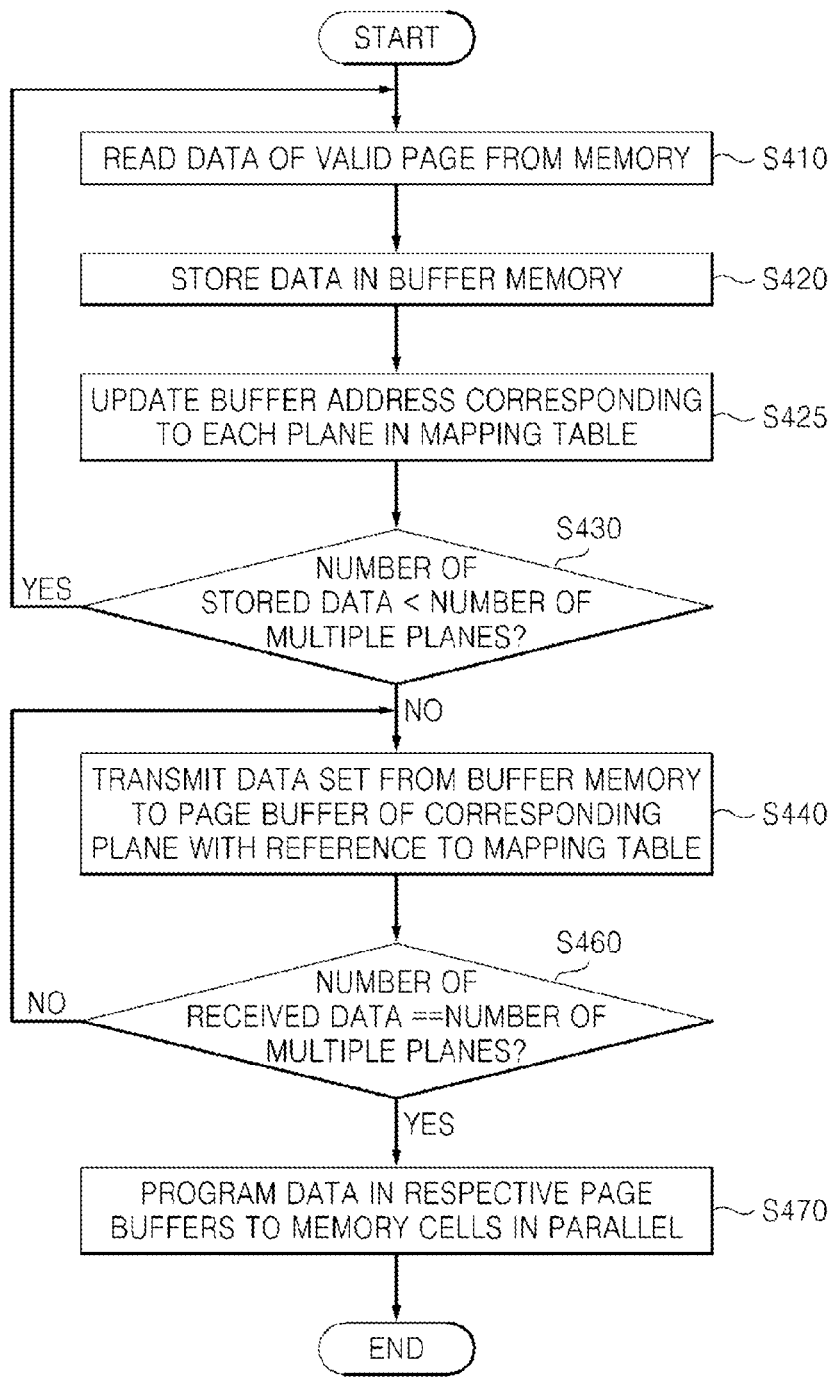
FIG. 14 is a flowchart of a memory control method during garbage collection according to some embodiments of the inventive concepts.

FIG. 14 is a flowchart of a memory control method during garbage collection according to some embodiments of the inventive concepts. Since the memory control method during garbage collection is similar to the memory control method illustrated in FIG. 12, differences therebetween will be mainly described to avoid redundancy.

The memory controller 100 reads data of a valid page from memory in operation S410. The memory controller 100 stores the data of the valid page in the buffer memory 110 in operation S420 and updates a buffer address corresponding to each plane in the mapping table 120 in operation S425. When data of as many valid pages as the number of multiple planes are stored in the buffer memory 110, the memory controller 100 acquires physical address information corresponding to each valid page from the FTL and the mapping table 120 and sequentially transmits the data of the valid pages to the non-volatile memory device 200 in operation S440.

When the data of valid pages as many as the number of multiple planes are stored in the page buffer and S/A block 220 in operation S460, the non-volatile memory device 200 programs the data of the valid pages to the memory cell array 210 at a time in operation S470.

Figure 15:
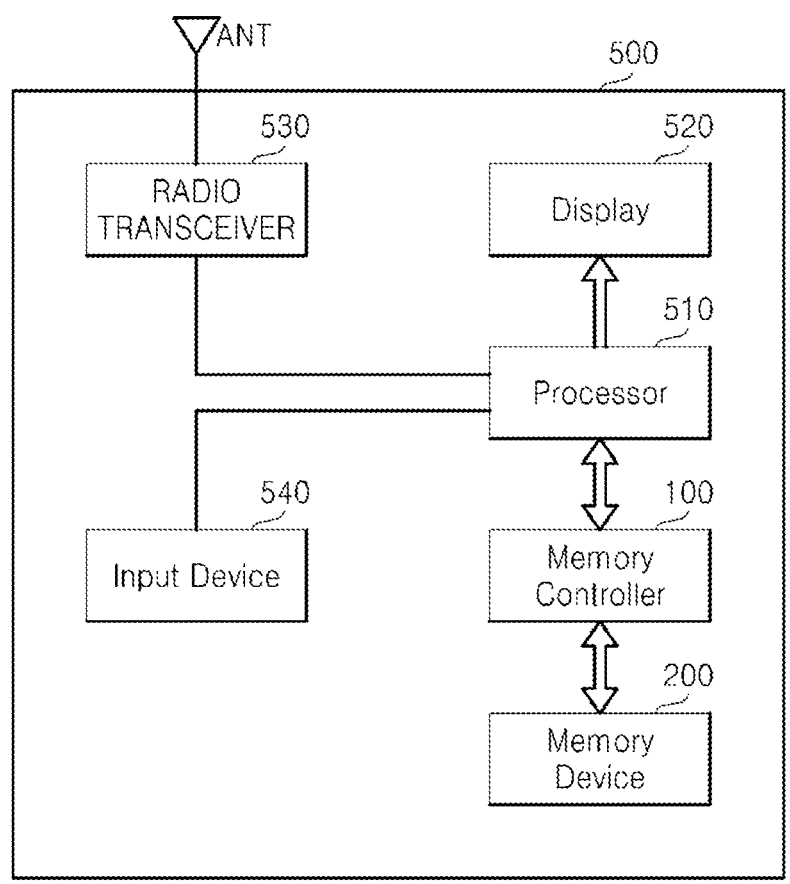
FIG. 15 is a block diagram of a data processing system including the memory system illustrated in FIG. 1 according to some embodiments of the inventive concepts.

FIG. 15 is a block diagram of a data processing system including the memory system illustrated in FIG. 1 according to some embodiments of the inventive concepts.

Referring to FIG. 15, the data processing system 500 may be implemented as a cellular phone, a smart phone, a tablet personal computer (PC), a personal digital assistant (PDA) or a radio communication system.

The data processing system 500 includes the memory device 200 and a memory controller 100 controlling the operations of the memory device 200. The memory controller 100 may control the data access operations, e.g., a program operation, an erase operation, and a read operation, of the memory device 200 according to the control of a processor 510.

The page data programmed in the memory device 200 may be displayed through a display 520 according to the control of the processor 510 and/or the memory controller 150.

A radio transceiver 530 transmits or receives radio signals through an antenna ANT. The radio transceiver 530 may convert radio signals received through the antenna ANT into signals that can be processed by the processor 510. Accordingly, the processor 510 may process the signals output from the radio transceiver 530 and transmit the processed signals to the memory controller 100 or the display 520. The memory controller 100 may program the signals processed by the processor 510 to the memory device 200. The radio transceiver 530 may also convert signals output from the processor 510 into radio signals and outputs the radio signals to an external device through the antenna ANT.

An input device 540 enables control signals for controlling the operation of the processor 510 or data to be processed by the processor 510 to be input to the data processing system 500. The input device 540 may be implemented by a pointing device such as a touch pad or a computer mouse, a keypad, or a keyboard.

The processor 510 may control the operation of the display 520 to display data output from the memory controller 100, data output from the radio transceiver 130, or data output from the input device 540. The memory controller 100, which controls the operations of the memory device 200, may be implemented as a part of the processor 510 or as a separate chip.

Figure 16:
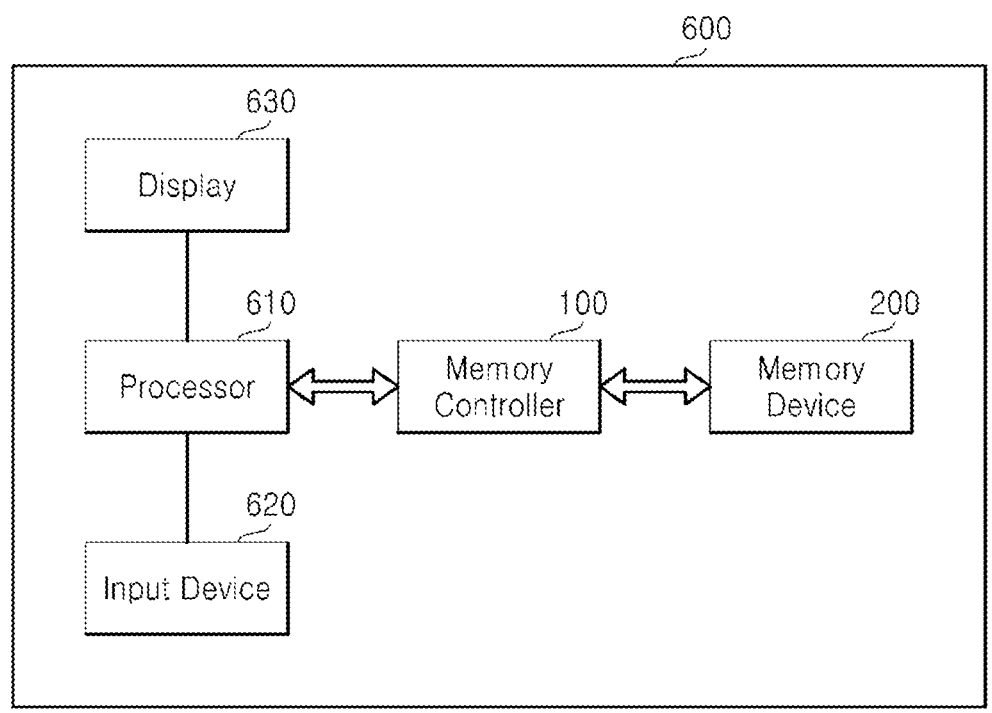
FIG. 16 is a block diagram of a data processing system including the memory system illustrated in FIG. 1 according to other embodiments of the inventive concepts.

FIG. 16 is a block diagram of a data processing system including the memory system illustrated in FIG. 1 according to other embodiments of the inventive concepts.

Referring to FIG. 16, the data processing system 600 may be implemented as a PC, a tablet PC, a net-book, an e-reader, a PDA, a portable multimedia player (PMP), an MP3 player, or an MP4 player.

The data processing system 600 includes the memory device 200 and a controller 100, which may control the data processing operations of the memory device 200. A processor 210 may display data stored in the memory device 200 through a display 630 according to data input through an input device 620. The input device 620 may be implemented by a pointing device such as a touch pad or a computer mouse, a keypad, or a keyboard.

The processor 610 may control the overall operation of the data processing system 600 and the operations of the memory controller 100. The memory controller 100, which may control the operations of the memory device 200, may be implemented as a part of the processor 610 or as a separate chip.

Figure 17:
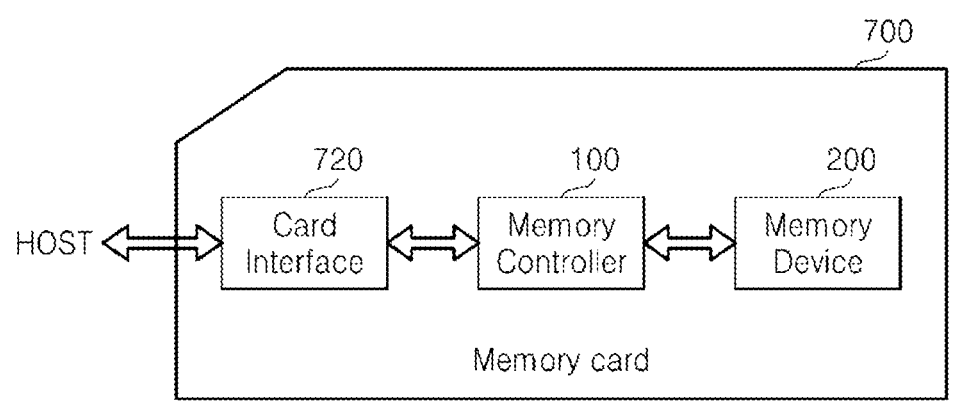
FIG. 17 is a block diagram of a data processing system including the memory system illustrated in FIG. 1 according to further embodiments of the inventive concepts.

FIG. 17 is a block diagram of a data processing system including the memory system illustrated in FIG. 1 according to further embodiments of the inventive concepts;

Referring to FIG. 17, the data processing system 700 may be implemented as a memory card or a smart card. The data processing system 700 includes the memory device 200, a memory controller 100, and a card interface 720.

The memory controller 100 may control data exchange between the memory device 200 and the card interface 720. The card interface 720 may be a secure digital (SD) card interface or a multi-media card (MMC) interface, but the inventive concepts is not restricted to the current embodiments.

The card interface 720 may interface a host and the memory controller 100 for data exchange according to a protocol of the host. The card interface 720 may support a universal serial bus (USB) protocol and an interchip (IC)-USB protocol. Here, the card interface 720 may indicate a hardware supporting a protocol used by the host, a software installed in the hardware, or a signal transmission mode.

When the data processing system 700 is connected with the host such as a PC, a tablet PC, a digital camera, a digital audio player, a cellular phone, a console video game hardware, or a digital set-top box, the host may perform data communication with the memory device 200 through the card interface 720 and the memory controller 100.

Figure 18:
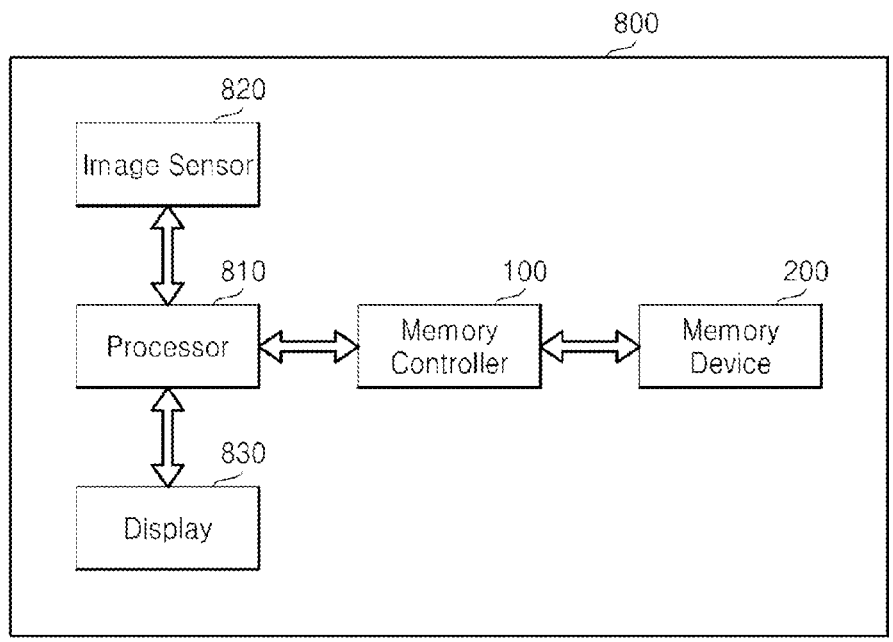
FIG. 18 is a block diagram of a data processing system including the memory system illustrated in FIG. 1 according to other embodiments of the inventive concepts.

FIG. 18 is a block diagram of a data processing system including the memory system illustrated in FIG. 1 according to other embodiments of the inventive concepts.

Referring to FIG. 18, the data processing system 800 may be implemented as an image processor like a digital camera, a cellular phone equipped with a digital camera, a smart phone equipped with a digital camera, or a tablet PC equipped with a digital camera.

The data processing system 800 includes the memory device 200 and a memory controller 100 controlling the data processing operations, such as a program operation, an erase operation, and a read operation, of the memory device 200. An image sensor 820 included in the data processing system 800 converts optical images into digital signals and outputs the digital signals to a processor 810 or the memory controller 100. The digital signals may be controlled by the processor 810 to be displayed through a display 830 or stored in the memory device 200 through the memory controller 100.

Data stored in the memory device 200 may be displayed through the display 830 according to the control of the processor 810 or the memory controller 100. The memory controller 100, which may control the operations of the memory device 200, may be implemented as a part of the processor 810 or as a separate chip.

Figure 19:
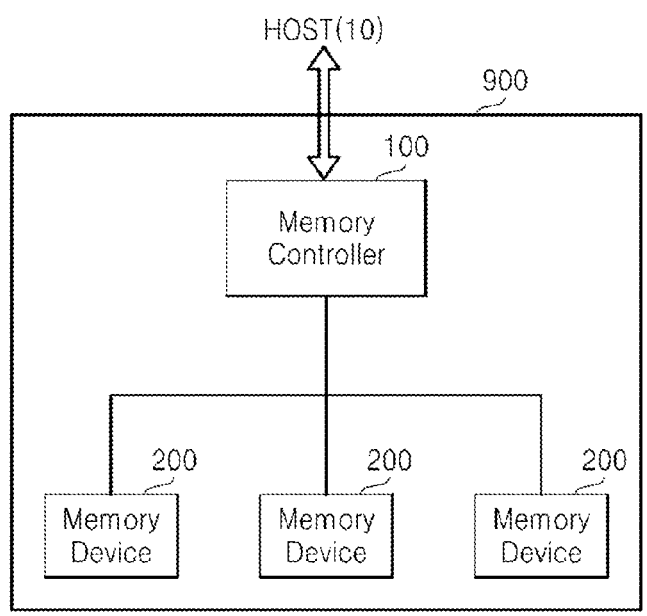
FIG. 19 is a block diagram of a data processing system including the memory system illustrated in FIG. 1 according to still other embodiments of the inventive concepts.

FIG. 19 is a block diagram of a data processing system including the memory system illustrated in FIG. 1 according to still other embodiments of the inventive concepts.

Referring to FIG. 19, the data processing system 900 may be implemented as a data storage system like a solid state drive (SSD).

The data processing system 900 includes a plurality of memory devices 200, a memory controller 100 controlling the data processing operations of the memory devices 200.

The data processing system 900 may be implemented as a memory module.

Figure 20:
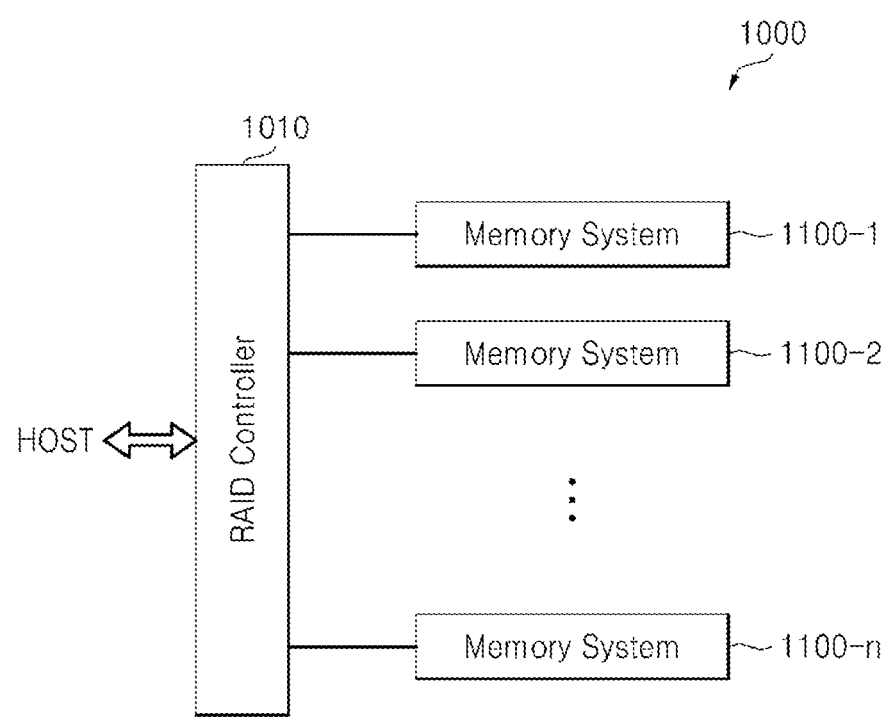
FIG. 20 is a block diagram of a data storage apparatus including the data processing system illustrated in FIG. 19.

FIG. 20 is a block diagram of a data storage apparatus including the data processing system illustrated in FIG. 19.

Referring to FIGS. 19 and 20, the data storage apparatus 1000 may be implemented as a redundant array of independent disks (RAID) system. The data storage apparatus 1000 includes a RAID controller 1010 and a plurality of memory modules 1100-1 through 1100-n where "n" is a natural number.

Each of the memory modules 1100-1 through 1100-n may be the data processing system 900 illustrated in FIG. 19. The memory modules 1100-1 through 1100-n may form a RAID array. The data storage apparatus 1000 may be a PC or an SSD.

During a program operation, the RAID controller 1010 may transmit program data output from a host to at least one of the memory modules 1100-1 through 1100-n according to a RAID level in response to a program command received from the host. During a read operation, the RAID controller 1010 may transmit to the host data read from at least one of the memory modules 1100-1 through 1100-n in response to a read command received from the host.

As described above, according to some embodiments of the inventive concepts, data having unsequential logical addresses are simultaneously programmed in a memory system, so that a channel is used efficiently without the decrease of a WAF. As a result, the performance and the lifespan of the memory system are increased.

While the inventive concepts has been particularly shown and described with reference to exemplary embodiments thereof, it will be understood by those of ordinary skill in the art that various changes in forms and details may be made therein without departing from the spirit and scope of the inventive concepts as defined by the following claims.

What is claimed is:

1. A method of controlling a non-volatile memory device including multiple planes, the method comprising:
receiving at least one write request from a host, the at least one write request including a plurality of data sets, each of the plurality of data sets including at least one page of data;
storing the plurality of data sets at buffer addresses in a buffer;
storing the buffer addresses in a mapping table, the mapping table being configured to map the buffer addresses to the multiple planes;
sequentially transmitting, according to the mapping table, the plurality of data sets stored at respective ones of the buffer addresses to page buffers of the multiple planes corresponding to the buffer addresses; and
programming, in parallel, at least two of the plurality of data sets from the page buffers to memory cells of the non-volatile memory device.

2. The method of claim 1, wherein the multiple planes include at least two planes.

3. The method of claim 1, wherein the at least one write request is a random write request.

4. The method of claim 1, wherein
a number of the plurality of data sets sequentially transmitted to the page buffers is the same as a number of the multiple planes, if a number of the plurality of data sets stored in the buffer is at least equal to the number of the multiple planes, and
the programming simultaneously programs the plurality of data sets to the memory cells if a number of the plurality of data sets stored in the respective page buffers equals the number of the multiple planes.

5. The method of claim 1, further comprising:
setting a start time if a data set among the plurality of data sets received from the host and stored in the buffer corresponds to a desired plane among the multiple planes; and
checking whether a time limit from the start time has been reached.

6. The method of claim 5, further comprising:
performing a multi-plane program operation on a number of the plurality of data sets, which is less than a number of the multiple planes, if a number of the plurality of data sets stored in the buffer is less than the number of the multiple planes after reaching the time limit.

7. The method of claim 6, wherein the performing the multi-plane program operation on the number of the plurality of data sets, which is less than the number of the multiple planes, comprises:
sequentially storing data sets among the number of the plurality of data sets in respective page buffers of corresponding planes of the non-volatile memory device; and
programming, in parallel, valid data sets from among the data sets stored in the page buffers, and at least one invalid data set stored in at least one page buffer of at least one uncorresponding plane, in the memory cells.

8. The method of claim 6, wherein the performing the multi-plane program operation on the number of the plurality of data sets, which is less than the number of the multiple planes, comprises:
sequentially storing, in page buffers of corresponding planes of the non-volatile memory device, as many data sets as a maximum number of available planes from among the plurality of data sets stored in the buffer;
programming, in parallel, as many of the plurality of data sets as the maximum number of available planes in the memory cells;
storing, in a page buffer of a corresponding plane of the non-volatile memory device, a remaining data set, from among the plurality of data sets, remaining in the buffer; and
programming the remaining data set stored in the page buffer, wherein
the maximum number of available planes is a maximum number of available planes that are simultaneously programmable by the non-volatile memory device, and
the maximum number is a value less than the number of the plurality of data sets stored in the buffer.

9. The method of claim 1, wherein the mapping table stores a buffer address corresponding to each of the multiple planes and the mapping table is updated if a data set is stored in the buffer.

10. A non-transitory computer-readable medium storing a program which, when executed by a computer, performs the method of claim 1.

11. A method of controlling a non-volatile memory device including multiple planes, the method comprising:
storing, in a buffer, a number of valid pages of data, the number of valid pages of data corresponding to a number of the multiple planes of the non-volatile memory device;
storing buffer addresses in a mapping table, the buffer addresses corresponding to a storage location of the valid pages of data, the mapping table configured to map the buffer addresses to the multiple planes; and
performing a multi-plane program operation on the valid pages of data stored at the buffer addresses according to the mapping table.

12. The method of claim 11, wherein the performing the multi-plane program operation comprises:
sequentially transmitting the valid pages of data from the buffer to respective page buffers of the multiple planes; and simultaneously programming the valid pages of data in the page buffers based on a physical address associated with the valid pages of data.

13. A memory system comprising:
a buffer memory;
a non-volatile memory device including multiple planes; and
a memory controller configured to,
receive a plurality of write requests, each of the plurality of write requests including a logical address and a data set from a host,
store the data sets in the buffer memory in response to the plurality of write requests, the data sets having corresponding logical addresses included in the plurality of write requests, the logical addresses being non-sequential,
sequentially transmit the data sets from the buffer memory to respective page buffers of the multiple planes, and
perform a multi-plane program operation to program the data sets in the respective page buffers to the non-volatile memory device.

14. The memory system of claim 13, wherein the memory controller comprises:
a mapping table including buffer address information corresponding to each of the multiple planes.

15. The memory system of claim 14, wherein
the multiple planes include four planes, each of the four planes including one of a first, second, third, and fourth pages,
the memory controller is configured to control a first of the data sets, the first of the data sets corresponding to a first of the logical addresses to be stored in the first page;
the memory controller is configured to control a second of the data sets, the second of the data sets corresponding to a second of the logical addresses to be stored in the second page;
the memory controller is configured to control a third of the data sets, the third of the data sets corresponding to a third of the logical addresses to be stored in the third page;
the memory controller is configured to control a fourth of the data sets, the fourth of the data sets corresponding to a fourth of the logical addresses to be stored in the fourth page; and
at least two logical addresses among the first through the fourth logical addresses are non-sequential.

16. The memory system of claim 15, wherein
the memory controller is configured to sequentially transmit the first through fourth data sets from the buffer memory to the respective page buffers of the multiple planes with reference to the mapping table; and
the first through fourth data sets stored in the respective page buffers are simultaneously programmed to the first through fourth pages, respectively.

17. The memory system of claim 13, wherein the memory controller is configured to perform the multi-plane program operation if a number of data sets stored in the buffer memory is at least equal to a number of the multiple planes.

18. The memory system of claim 13, wherein the memory controller comprises:
a timer configured to count a duration from a start time, the start time being when a data set among the data sets stored in the buffer memory corresponds to a desired one of the multiple planes, and wherein
the memory controller is configured to perform the multi-plane program operation irrespective of whether a number of the data sets stored in the buffer memory is less than a number of multiple planes if the duration counted by the timer exceeds a time limit.

19. The memory system of claim 13, wherein the memory system is one of a memory card, a memory drive, and a solid state drive (SSD).

20. A memory controller configured to control a non-volatile memory device, the memory controller comprising:
a buffer memory configured to store data sets included in a plurality of write requests received from a host, the plurality of write requests further including logical addresses corresponding to the data sets, the logical addresses being non-sequential; and
a central processing unit (CPU) configured to control the non-volatile memory device to perform a multi-plane program operation to program the data sets stored in the buffer memory in the non-volatile memory device, in response to the plurality of write requests; wherein
the data sets subjected to the multi-plane program operation have non-sequential logical addresses.

21. The memory controller of claim 20, further comprising:
a mapping table configured to store buffer address information corresponding to multiple planes of the non-volatile memory device.

22. The memory controller of claim 21, further comprising:
a timer configured to set a start time count if a data set, among the data sets received from the host and stored in the buffer memory, corresponds to a desired plane among the multiple planes, and wherein
the CPU is configured to check whether a time limit from the start time has been reached.

23. The memory controller of claim 22, wherein the CPU is further configured to perform the multi-plane program operation on a number of the data sets that is less than a number of the multiple planes if a number of the data sets stored in the buffer memory is less than the number of the multiple planes when the time limit is reached.

24. The memory controller of claim 20, wherein the CPU is further configured to perform the multi-plane program operation if a number of the data sets stored in the buffer memory is at least equal to a number of the multiple planes.

25. A method of controlling a non-volatile memory device via a memory controller, the non-volatile memory device having multiple planes, each of the multiple planes including a page buffer, and the memory controller including a buffer memory configured to store a plurality of data sets corresponding to non-sequential logical addresses, the method comprising:
receiving, at the memory controller, a plurality of write requests, each of the plurality of write requests including a logical address and a data set from among the plurality of data sets;
storing each of the plurality of data sets at addresses of the buffer memory;
sequentially transmitting a number of the plurality of data sets that is less than or equal to a number of the multiple planes, from the addresses of the buffer memory to page buffers of the multiple planes according to a mapping table, the mapping table mapping the addresses of the buffer memory to the multiple planes; and
programming, in parallel, the plurality of data sets from the page buffers to memory cells of the non-volatile memory device according to physical addresses corresponding to the logical addresses associated with the data sets.

26. The method of claim 25, wherein the number of the plurality of data sets that are sequentially transmitted is less than the number of planes, if a duration of time passes after a data set from among the plurality of data sets is stored at the buffer memory.

27. The method of claim 25, wherein the plurality of data sets include first through fourth data sets and the multiple planes include at least four planes that have at least four pages, the method further including, sequentially transmitting the first through fourth data sets from the buffer memory to a page buffer of a respective one of the four planes according to the mapping table, and programming, simultaneously, the first through fourth data sets stored in the page buffers to a first through fourth page of the at least four pages, respectively.

\* \* \* \* \*